(12) United States Patent
Zhao et al.

(10) Patent No.: US 11,694,744 B2
(45) Date of Patent: *Jul. 4, 2023

(54) MIXED DIGITAL-ANALOG MEMORY DEVICES AND CIRCUITS FOR SECURE STORAGE AND COMPUTING

(71) Applicant: HEFEI RELIANCE MEMORY LIMITED, Hefei (CN)

(72) Inventors: Liang Zhao, Sunnyvale, CA (US); Zhichao Lu, San Jose, CA (US)

(73) Assignee: Hefei Reliance Memory Limited, Hefei (CN)

( * ) Notice: Subject to any disclaimer, the term of this patent is extended or adjusted under 35 U.S.C. 154(b) by 49 days.

This patent is subject to a terminal disclaimer.

(21) Appl. No.: 17/368,182

(22) Filed: Jul. 6, 2021

(65) Prior Publication Data
US 2021/0335415 A1    Oct. 28, 2021

Related U.S. Application Data

(63) Continuation of application No. 16/876,616, filed on May 18, 2020, now Pat. No. 11,081,168.
(Continued)

(51) Int. Cl.
*G11C 7/00* (2006.01)
*G11C 11/4094* (2006.01)
(Continued)

(52) U.S. Cl.
CPC ........ *G11C 11/4094* (2013.01); *G06F 21/602* (2013.01); *G11C 5/05* (2013.01);
(Continued)

(58) Field of Classification Search
CPC ....... G11C 7/1051; G11C 7/1057; G11C 7/22; G11C 7/1072; G11C 7/1066; G11C 7/1006
(Continued)

(56) References Cited

U.S. PATENT DOCUMENTS

| 5,745,409 A | 4/1998 | Wong et al. |
| 6,215,705 B1 | 4/2001 | Al-Shamma |

(Continued)

FOREIGN PATENT DOCUMENTS

| CN | 101345088 A | 1/2009 |
| CN | 101689134 A | 3/2010 |

(Continued)

OTHER PUBLICATIONS

PCT International Search Report and the Written Opinion dated Sep. 21, 2020, issued in related International Application No. PCT/US2020/033957 (13 pages).

(Continued)

*Primary Examiner* — Son T Dinh
(74) *Attorney, Agent, or Firm* — Sheppard Mullin Richter & Hampton LLP

(57) ABSTRACT

A non-volatile memory device includes a plurality of memory cells arranged in a matrix, a plurality of word lines extended in a row direction, and a plurality of bit lines extended in a column direction. Each of the memory cells is coupled to one of the word lines and one of the bit lines. The memory device further includes a word-line control circuit coupled to and configured to control the word lines, a first bit-line control circuit configured to control the bit lines and sense the memory cells in a digital mode, and a second bit-line control circuit configured to bias the bit lines and sense the memory cells in an analog mode. The first bit-line control circuit is coupled to a first end of each of the bit lines. The second bit-line control circuit is coupled to a second end of each of the bit lines.

19 Claims, 16 Drawing Sheets

Related U.S. Application Data

(60) Provisional application No. 62/851,936, filed on May 23, 2019.

(51) Int. Cl.

| | | |
|---|---|---|
| *G11C 11/408* | (2006.01) | |
| *G11C 11/4091* | (2006.01) | |
| *G11C 5/06* | (2006.01) | |
| *G06F 21/60* | (2013.01) | |
| *G11C 5/05* | (2006.01) | |

(52) U.S. Cl.
CPC ............ *G11C 5/06* (2013.01); *G11C 11/4085* (2013.01); *G11C 11/4091* (2013.01); *G06F 2221/0755* (2013.01)

(58) Field of Classification Search
USPC ........................................ 365/189.15, 189.14
See application file for complete search history.

(56) References Cited

U.S. PATENT DOCUMENTS

| | | | |
|---|---|---|---|
| 7,495,953 | B2 | 2/2009 | Li |
| 8,102,706 | B2 | 1/2012 | Roohparvar et al. |
| 8,369,156 | B2 | 2/2013 | Li |
| 9,019,747 | B2 | 4/2015 | Tsuji |
| 9,912,474 | B2 | 3/2018 | Gupta et al. |
| 11,081,168 | B2 * | 8/2021 | Zhao .................... G11C 7/16 |
| 2003/0053333 | A1 | 3/2003 | Rudelic et al. |
| 2008/0244211 | A1 | 10/2008 | Ito |
| 2009/0003041 | A1 | 1/2009 | Kajigaya |
| 2010/0265783 | A1 | 10/2010 | Kem |
| 2014/0064001 | A1 * | 3/2014 | Heo .................... G11C 7/12 365/230.03 |
| 2017/0337466 | A1 | 11/2017 | Bayat et al. |
| 2018/0374525 | A1 | 12/2018 | Antonyan |
| 2019/0019564 | A1 | 1/2019 | Li et al. |

FOREIGN PATENT DOCUMENTS

| | | |
|---|---|---|
| CN | 103119655 A | 5/2013 |
| CN | 103238185 A | 8/2013 |
| CN | 105930903 A | 9/2016 |
| CN | 106847335 A | 6/2017 |
| EP | 1193715 A1 | 4/2002 |
| JP | H11-185491 A | 7/1999 |
| WO | 2012/102785 A1 | 8/2012 |
| WO | 2017/048293 A1 | 3/2017 |
| WO | 2018/008946 A1 | 1/2018 |

OTHER PUBLICATIONS

Notice of Allowance dated Apr. 2, 2021, issued in related U.S. Appl. No. 16/876,616 (9 pages).
First Search dated Jan. 28, 2022, issued in related Chinese Application No. 202080012609.4 (2 pages).
Partial Supplementary European Search Report dated Dec. 1, 2022, issued in related European Application No. 20810146.9 (14 pages).
Masanori Hayashikoshi et al., "A Dual-Mode Sensing Scheme of Capacitor Coupled EEPROM Cell for Super High Endurance", Proceedings of the Symposium on VLSI Circuits, Oiso, JP, May 30-Jun. 1, 1991, New York, IEEE, US, vol. Symp. 5, May 30, 1991, pp. 89-90.
PCT International Preliminary Report on Patentability dated Dec. 2, 2021, issued in related International Application No. PCT/US2020/033957 (10 pages).

* cited by examiner

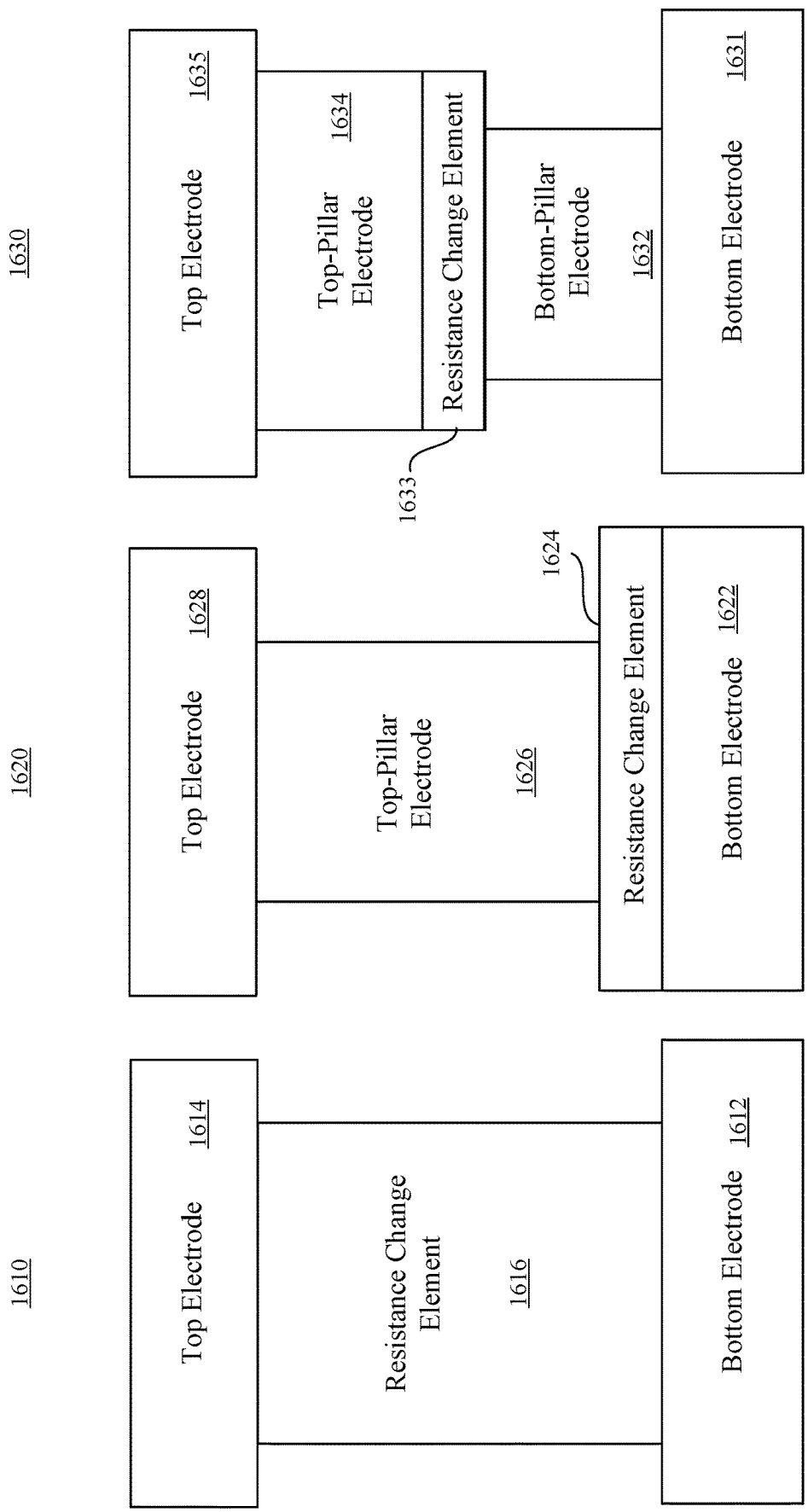

MIXED DIGITAL-ANALOG MEMORY DEVICES AND CIRCUITS FOR SECURE STORAGE AND COMPUTING

CROSS REFERENCE TO RELATED APPLICATIONS

This application is a continuation of U.S. Non-Provisional application Ser. No. 16/876,616, filed May 18, 2020, entitled "MIXED DIGITAL-ANALOG MEMORY DEVICES AND CIRCUITS FOR SECURE STORAGE AND COMPUTING," which claims the benefits of and priority to U.S. Provisional Application No. 62/851,936, filed May 23, 2019, entitled "MIXED DIGITAL-ANALOG MEMORY DEVICES AND CIRCUITS FOR SECURE STORAGE AND COMPUTING," the content of all of which is incorporated herein by reference in their entirety.

TECHNICAL FIELD

The disclosure relates generally to memory devices and methods of employing memory device for storage and computation purposes, and more specifically to mixed digital-analog memory devices and methods of employing mixed digital-analog memory devices for storage and computation purposes.

BACKGROUND

Memory devices are included in many electronic devices, such as cell phones, computers, cars, display devices, etc. Memory devices have been utilized to store data for various purposes. Generally, memory devices include two types of memory depending on whether the data stored therein is retained or erased after power is cut off. In volatile memory devices, the data is wiped out every time the power to the volatile memory devices are turned off. Whereas data stored in a non-volatile memory device is retained even after the power is turned off.

A non-volatile memory device generally includes a memory array that has tens of thousands of memory cells for storing data. A non-volatile memory device has been employed in neural networks that are used to produce mathematical models for machine learning and artificial intelligence (AI) applications. A well-trained neural network can include weights data, which is a valuable asset considering the time/resources needed to train the neural network. A well-trained neural network can also include unique training datasets and models. These datasets and models can be stored in one or more neural network chips that include non-volatile memory devices.

However, hackers may attempt to breach the data stored on a neural network chip and try to duplicate the neural network for their own profit/benefit. When a neural network is deployed in the field, an adversary has a variety of methods to attack and reverse engineer the neural network model and weights. For example, the hackers may simulate the input/output to generate a training set or directly probe the weights stored in memory device. It is particularly harmful if the hacker can easily probe the weights data that is generated with a lot of resources and time.

SUMMARY

One aspect of the present disclosure is directed to a non-volatile memory device. The non-volatile memory device includes a plurality of memory cells arranged in a matrix and a plurality of word lines extended in a row direction. Each of the memory cells is coupled to one of the word lines. The non-volatile memory device further includes a plurality of bit lines extended in a column direction. Each of the memory cells is coupled to one of the bit lines. The non-volatile memory device further includes a word-line control circuit coupled to and configured to control the word lines, a first bit-line control circuit configured to control the bit lines and sense the memory cells in a digital mode, and a second bit-line control circuit configured to bias the bit lines and sense the memory cells in an analog mode. The first bit-line control circuit is coupled to a first end of each of the bit lines. The second bit-line control circuit is coupled to a second end of each of the bit lines. The second end is opposite to the first end.

In some embodiments, the non-volatile memory device further includes a plurality of source lines extended in the row direction. Each of the source lines is coupled to a row of the memory cells. In some embodiments, each of the source lines may be coupled to two rows of the memory cells. In some embodiments, the non-volatile memory device may include a plurality of source lines extended in the column direction such that each of the source lines is coupled to a column of the memory cells.

In some embodiments, a first portion of the memory cells is biased and sensed in the digital mode, and a second portion of the memory cells is biased and sensed in the analog mode.

In some embodiments, the non-volatile memory device further includes a memory device control circuit coupled to the word-line control circuit, the first bit-line control circuit, and the second bit-line control circuit. The memory device control circuit is configured to read or write the first portion of the memory cells and the second portion of the memory cells in different operation cycles.

In some embodiments, the non-volatile memory device may include a memory device control circuit coupled to the word-line control circuit, the first bit-line control circuit, and the second bit-line control circuit. The memory device control circuit is configured to read or write the first portion of the memory cells and the second portion of the memory cells in one operation cycle.

In some embodiments, a pre-generated public key is stored in the first portion of the memory cells. The non-volatile memory device may further include a storage control circuit, which upon receiving data for storage in the non-volatile memory device is configured to read the pre-generated public key from the first portion of the memory cells, encrypt the data with the pre-generated public key, and store the encrypted data in one of the first portion of the memory cells or the second portion of the memory cells.

In some embodiments, the non-volatile memory device may include a memory device control circuit coupled to the word-line control circuit, the first bit-line control circuit, and the second bit-line control circuit. The memory device control circuit is configured to store a data having M bits. The most significant N bits of the M bits are stored in the first portion of the memory cells, and the least significant (M−N) bits of the M bits are stored in the second portion of the memory cells.

In some embodiments, the memory device control circuit is configured to enable the first bit-line control circuit to read the most significant N bits in the digital mode and to enable the second bit-line control circuit to read the least significant (M−N) bits in the analog mode.

In some embodiments, each of the memory cells includes a resistance-change element or a charge storing element.

In some embodiments, the memory device control circuit is configured to perform a neural network computation by: storing a respective weight value in each of the memory cells in the analog mode or the digital mode; controlling the word-line control circuit to provide input voltages to the word lines; and obtaining current responses from the first bit-line control circuit when the respective weight value in each of the memory cells is stored in the digital mode or obtaining current responses from the second bit-line control circuit when the respective weight value in each of the memory cells is stored in the analog mode.

Another aspect of the present disclosure is directed to a method for operating a mixed digital-analog memory device. The non-volatile memory device includes a plurality of memory cells arranged in a matrix and a plurality of word lines extended in a row direction. Each of the memory cells is coupled to one of the word lines. The non-volatile memory device further includes a plurality of bit lines extended in a column direction. Each of the memory cells is coupled to one of the bit lines. The non-volatile memory array further includes a word-line control circuit coupled to and configured to control the word lines, a first bit-line control circuit coupled to a first end of each of the bit lines, and a second bit-line control circuit coupled to a second end of each of the bit lines. The second end is opposite to the first end. The method includes: biasing and sensing a first portion of the memory cells in the digital mode with the first bit-line control circuit, and biasing and sensing a second portion of the memory cells in the analog mode with the second bit-line control circuit.

In some embodiments, the method further includes reading or writing the first portion of the memory cells and the second portion of the memory cells in different operation cycles. In some embodiments, the method further includes reading or writing the first portion of the memory cells and the second portion of the memory cells in one operation cycle.

In some embodiments, the method further includes storing a pre-generated public key in the first portion of the memory cells; receiving data for storage in the mixed digital-analog memory device; reading the pre-generated public key from the first portion of the memory cells; encrypting the data with the pre-generated public key; and storing the encrypted data in one of the first portion of the memory cells or the second portion of the memory cells.

In some embodiments, the method further includes receiving a data having M bits; storing the most significant N bits of the M bits in the first portion of the memory cells; and storing the least significant (M−N) bits of the M bits in the second portion of the memory cells.

In some embodiments, the method further includes storing a weight value in a respective memory cell in the analog mode or the digital mode; controlling the word-line control circuit to provide input voltages to the word lines; and obtaining current responses from the first bit-line control circuit when the weight value in the respective memory cell is stored in the digital mode or obtaining current responses from the second bit-line control circuit when the weight value in the respective memory cell is stored in the analog mode.

Another aspect of the present disclosure is directed to a method for storing a data. The data is stored in an analog mode in a first mixed digital-analog memory array, resulting in a first variation of the data. A first correction value is calculated for compensating the first variation of the data. The first correction value is stored in the first mixed digital-analog memory array in a digital mode. The data is also stored in the analog mode in a second mixed digital-analog memory array, resulting in a second variation of the data. A second correction value is calculated for compensating the second variation of the data. The second correction value is different from the first correction value. The second correction value is stored in the second mixed digital-analog memory array in the digital mode.

These and other features of the apparatuses, systems, and methods, disclosed herein, as well as the methods of operation and functions of the related elements of structure, will become more apparent upon consideration of the following description and the appended claims with reference to the accompanying drawings, all of which form a part of this specification. It is to be expressly understood, however, that the drawings are for purposes of illustration and description only and are not intended as a definition of the limits of the disclosure. It is to be understood that the foregoing general description and the following detailed description are exemplary and explanatory only, and are not restrictive of the disclosure, as claimed.

BRIEF DESCRIPTION OF THE DRAWINGS

Non-limiting embodiments of the disclosure may be more readily understood by referring to the following drawings.

FIGS. 16A-16C are block diagrams illustrating memory cell structures that include resistance-change elements, according to various embodiments.

DETAILED DESCRIPTION OF EMBODIMENTS

Non-limiting embodiments of the present disclosure will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present disclosure. Various changes and modifications obvious to one skilled in the art to which the present disclosure pertains are deemed to be within the spirit, scope and contemplation of the present disclosure as further defined in the appended claims.

Techniques disclosed herein provide mixed digital-analog memory arrays, devices, and various applications of such arrays and devices. Also disclosed are methods for operating mixed digital-analog memory arrays and devices.

Figure 1:
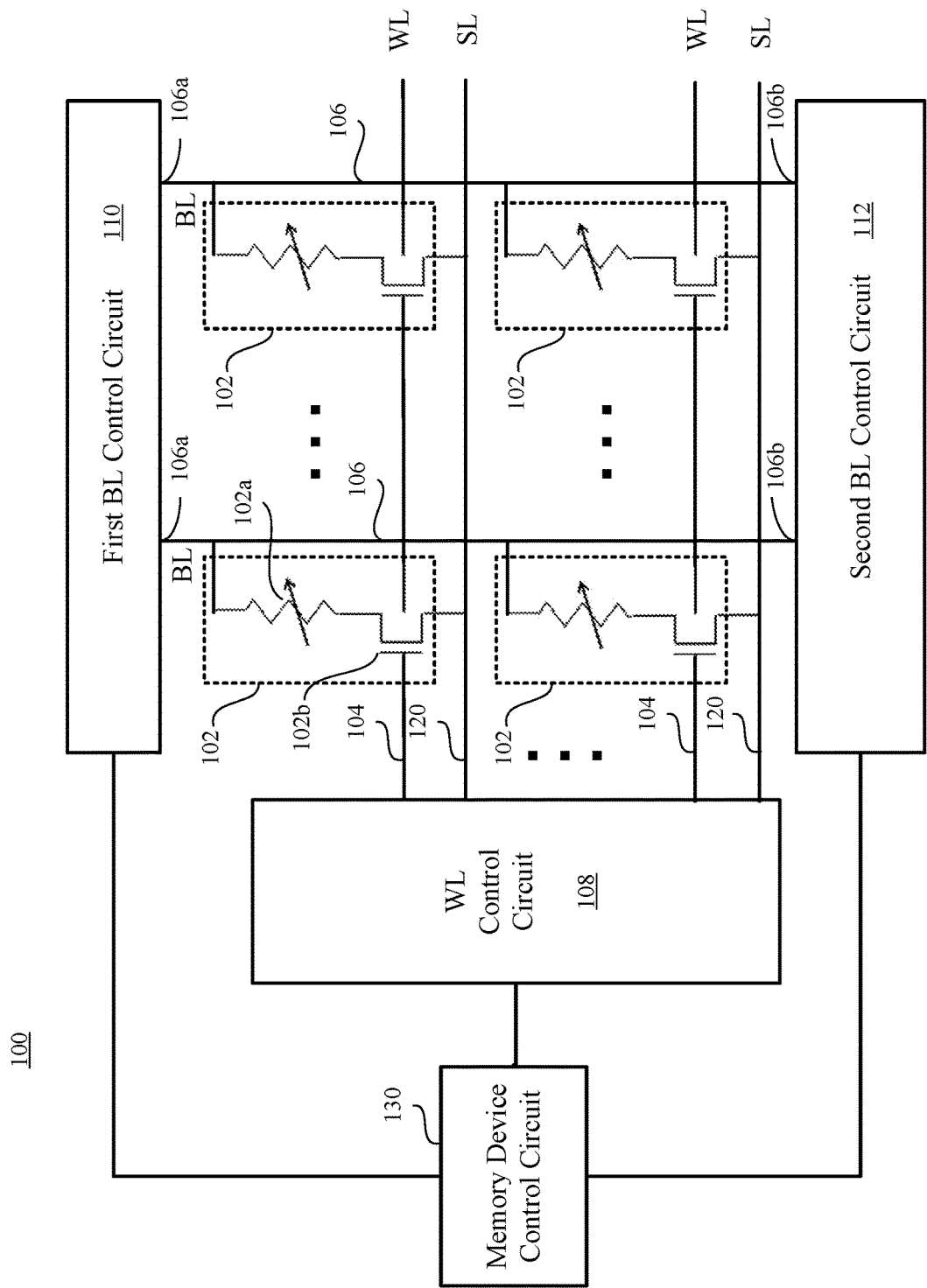
FIG. 1 is a schematic diagram illustrating a non-volatile memory device, according to one example embodiment.

Embodiments will now be explained with reference to accompanying figures. Reference is first made to FIG. 1. FIG. 1 is a schematic diagram illustrating a non-volatile memory device 100, according to one example embodiment. The non-volatile memory device 100 may be a resistive random access memory (RRAM) device. The non-volatile memory device 100 includes a plurality of memory cells 102 arranged in a matrix, a plurality of word lines 104 extended in a row direction, and a plurality of bit lines 106 extended in a column direction. The non-volatile memory device 100 further includes a word-line control circuit 108 coupled to and configured to control the word lines 104, a first bit-line control circuit 110 configured to control the bit lines 106 and sense the memory cells 102 in a digital mode, and a second bit-line control circuit 112 configured to bias the bit lines 106 and sense the memory cells 102 in an analog mode. Each of the memory cells 102 is coupled to one of the word lines 104 and one of the bit lines 106. The first bit-line control circuit 110 is coupled to a first end 106a of each of the bit lines 106. The second bit-line control circuit 112 is coupled to a second end 106b of each of the bit lines 106. The second end 106b of a bit line 106 is opposite to the first end 106a of the bit line 106.

The non-volatile memory device 100 further includes a plurality of source lines 120 extended in the row direction. Each of the source lines 120 is coupled to a row of the memory cells 102. In some embodiments, each of the memory cell 102 may include a resistive element 102a and a transistor 102b. A gate of the transistor 102b is connected to a word line 104. A source terminal of the transistor 102b is connected to a source line 120, and a drain terminal of the transistor 102b is connected to one terminal of a resistive element 102a. Another terminal of the resistive element 102a is connected to a bit line 106. The resistance memory cell 102 at the intersection of a selected word line 104 and a selected bit line 106 is subject to a read, reset, or set operation, depending on the duration, magnitude and polarity of respective voltage pulses applied across the resistance memory cell 102 via the selected word line 104 and the selected bit line 106. The resistive element 102a can be programmed to switch between two states, resulting in an operation of the digital mode. The resistive element 102a also can be programmed to switch among more than two states, e.g., three or four states, resulting in an operation of the analog mode.

In some embodiments, a first portion of the memory cells 102 is biased and sensed in the digital mode by the first bit-line control circuit 110 and a second portion of the memory cells 102 is biased and sensed in the analog mode by the second bit-line control circuit 112.

The non-volatile memory device 100 further includes a memory device control circuit 130 coupled to the word-line control circuit 108, the first bit-line control circuit 110, and the second bit-line control circuit 112. In some embodiments, the memory device control circuit 130 is configured to read or write the first portion of the memory cells 102 and the second portion of the memory cells 102 in different operation cycles. For example, in the first operation cycle, the memory device control circuit 130 enables the first bit-line control circuit 110 to read or write the first portion of the memory cells 102 in the digital mode while the second portion of the memory cells are not subject to a read or write operation. After the first operation cycle, in the second cycle, the memory device control circuit 130 enables the second bit-line control circuit 112 to read or write the second portion of the memory cells 102 in the analog mode while the first portion of the memory cells are not subject to a read or write operation.

In some embodiments, the memory device control circuit 130 is configured to read or write the first portion of the memory cells 102 and the second portion of the memory cells 102 in one operation cycle. For example, in one operation cycle, the memory device control circuit 130 first enables the first bit-line control circuit 110 to read or write the first portion of the memory cells 102 in the digital mode and then enables the second bit-line control circuit 112 to read or write the second portion of the memory cells 102 in the analog mode, or vice versa.

In some embodiments, the first bit-line control circuit 110 and the second bit-line control circuit 112 may be independently controlled by the memory device control circuit 130. This provides flexibility in controlling the operations of the memory device 100. It is to be understood that the numbers of the memory cells 102, the word lines 104, the bit lines 106, the source lines 120 are not limited to those shown in FIG. 1. One of ordinary skill in the art could increase or decrease the numbers of those elements based on application needs.

Figure 2:
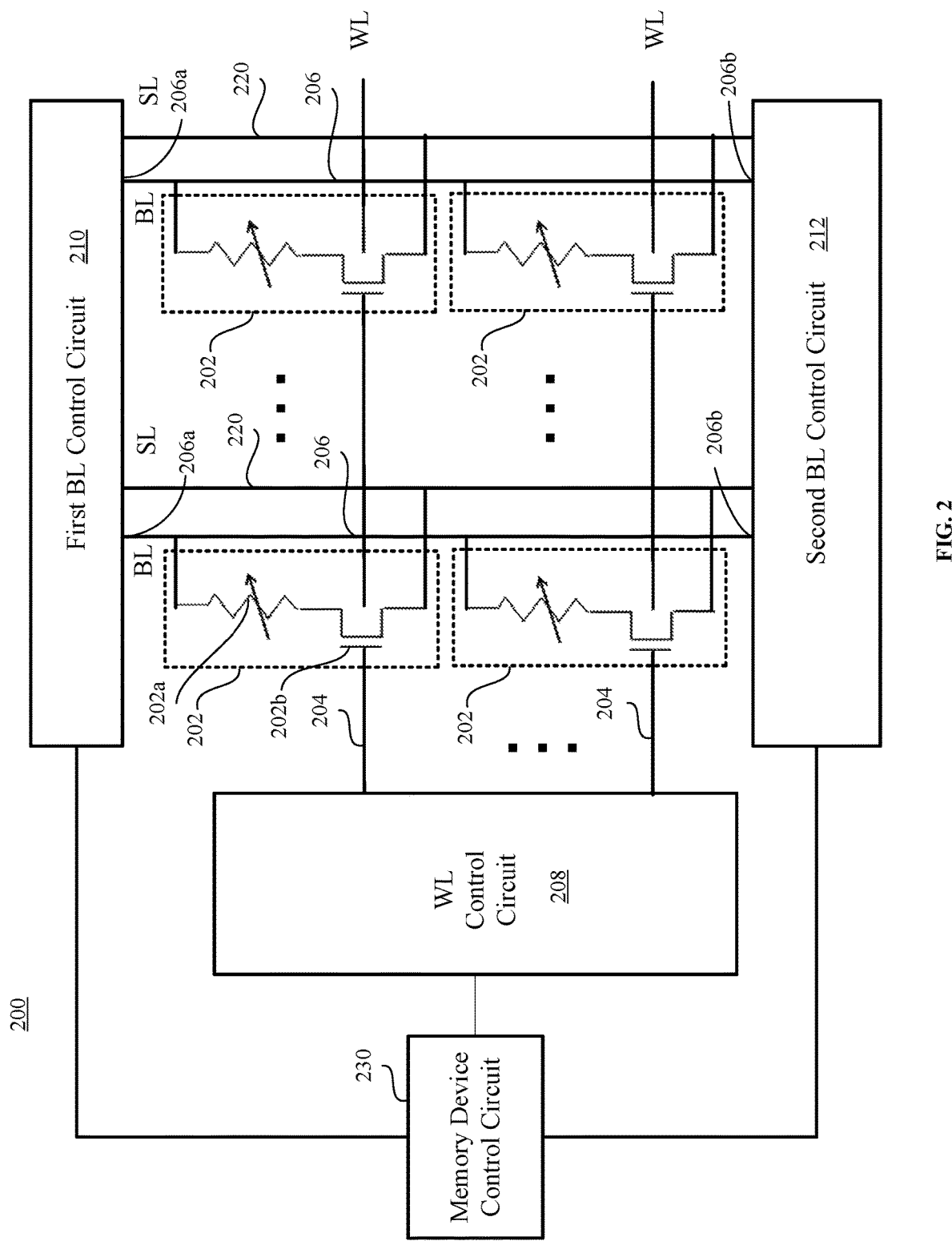
FIG. 2 is a schematic diagram illustrating another non-volatile memory device, according to one example embodiment.

FIG. 2 is a schematic diagram illustrating another non-volatile memory device 200, according to one example embodiment. The non-volatile memory device 200 may be an RRAM. The non-volatile memory device 200 includes a plurality of memory cells 202 arranged in a matrix, a plurality of word lines 204 extended in a row direction, and a plurality of bit lines 206 extended in a column direction. The non-volatile memory device 200 further includes a word-line control circuit 208 coupled to and configured to control the word lines 204, a first bit-line control circuit 210 configured to control the bit lines 206 and sense the memory cells 202 in a digital mode, and a second bit-line control circuit 212 configured to bias the bit lines 206 and sense the memory cells 202 in an analog mode. Each of the memory cells 202 is coupled to one of the word lines 204 and one of the bit lines 206. The first bit-line control circuit 210 is coupled to a first end 206a of each of the bit lines 206. The second bit-line control circuit 212 is coupled to a second end 206b of each of the bit lines 206. The second end 206b of the bit lines 206 is opposite to the first end 206a of the bit lines 206.

The non-volatile memory device 200 further includes a plurality of source lines 220 extended in the column direction. Each of the source lines 220 is coupled to a column of the memory cells 202. The non-volatile memory device 200 further includes a memory device control circuit 230 coupled to and configured to control the word-line control circuit 208, the first bit-line control circuit 210, and the second bit-line control circuit 212. The structures and functions of the non-volatile memory device 200 are similar to those of the non-volatile memory device 100 in FIG. 1, except that the source line 220 are arranged to extend in the column direction.

Figure 3:
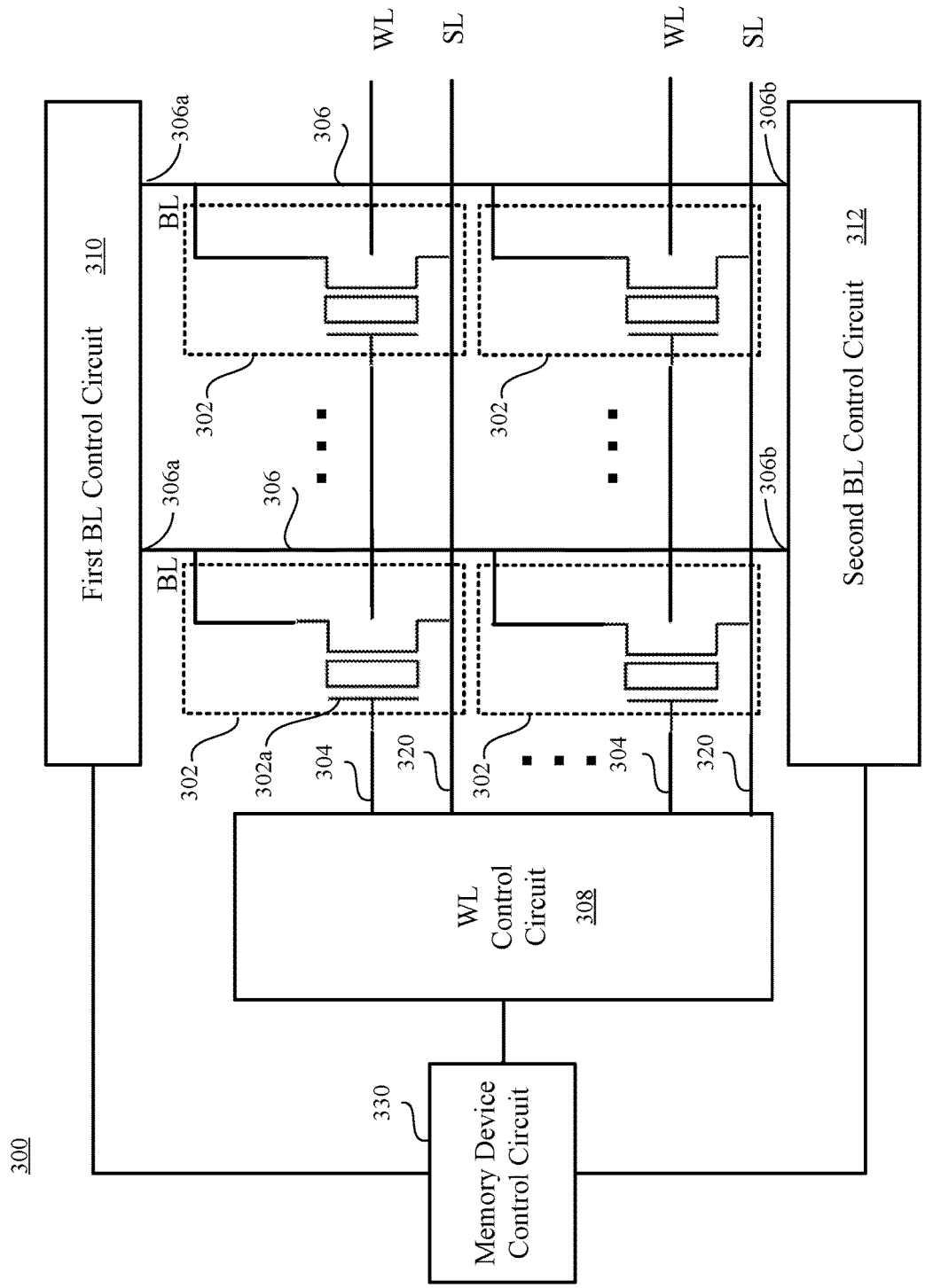
FIG. 3 is a schematic diagram illustrating yet another non-volatile memory device, according to one example embodiment.

FIG. 3 is a schematic diagram illustrating another non-volatile memory device 300, according to one example embodiment. The non-volatile memory device 300 includes a plurality of memory cells 302 arranged in a matrix, a plurality of word lines 304 extended in a row direction, and a plurality of bit lines 306 extended in a column direction. The non-volatile memory device 300 further includes a word-line control circuit 308 coupled to and configured to control the word lines 304, a first bit-line control circuit 310 configured to control the bit lines 306 and sense the memory cells 302 in a digital mode, and a second bit-line control circuit 312 configured to bias the bit lines 306 and sense the memory cells 302 in an analog mode. Each of the memory cells 302 is coupled to one of the word lines 304 and one of the bit lines 306. The first bit-line control circuit 310 is coupled to a first end 306a of each of the bit lines 306. The second bit-line control circuit 312 is coupled to a second end 306b of each of the bit lines 306. The second end 306b of the bit lines 306 is opposite to the first end 306a of the bit lines 306.

The non-volatile memory device 300 further includes a plurality of source lines 320 extended in the row direction. Each of the source lines 320 is coupled to a row of the memory cells 302. The non-volatile memory device 300 further includes a memory device control circuit 330 coupled to and configured to control the word-line control circuit 308, the first bit-line control circuit 310, and the second bit-line control circuit 312. The structures and functions of the non-volatile memory device 300 are similar to those of the non-volatile memory device 100 in FIG. 1, except that each of the memory cells 302 is composed of a charge-storage element 302a. In some embodiments, the charge-storage element 302a may include a transistor that has a floating gate to store charges. A charge-storage element 302a may be controlled by a word line 304, a bit line 306, and a source line 320 to change the charges stored therein. The charge-storage element 302a can be programmed to switch between two charging states, resulting in an operation of the digital mode. The resistive element 102a also can be programmed to switch among more than two charging states, e.g., three or four charging states, resulting in an operation of the analog mode.

Figure 4:
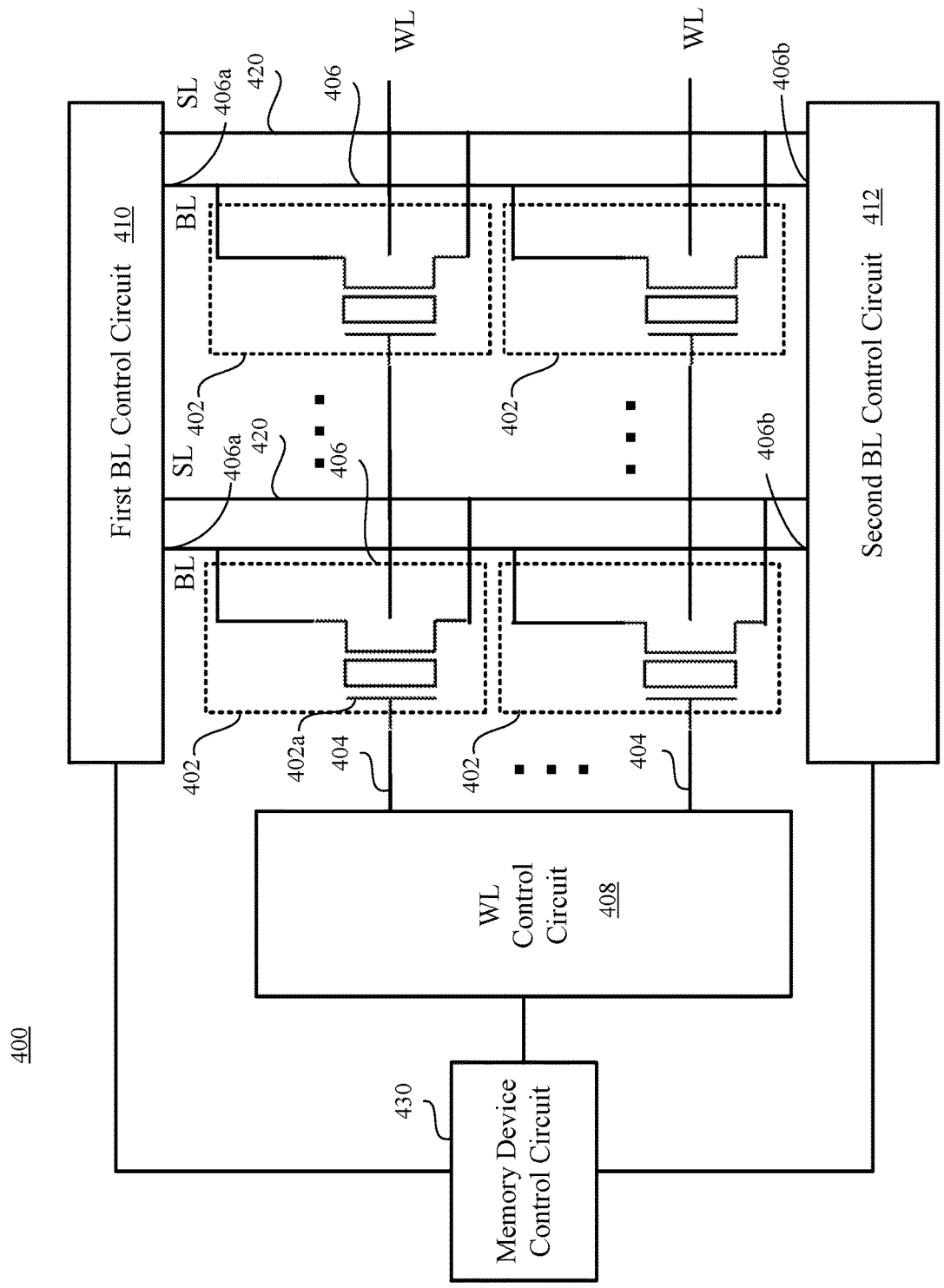
FIG. 4 is a schematic diagram illustrating yet another non-volatile memory device, according to one example embodiment.

FIG. 4 is a schematic diagram illustrating another non-volatile memory device 400, according to one example embodiment. The non-volatile memory device 400 includes a plurality of memory cells 402 arranged in a matrix, a plurality of word lines 404 extended in a row direction, and a plurality of bit lines 406 extended in a column direction. The non-volatile memory device 400 further includes a word-line control circuit 408 coupled to and configured to control the word lines 404, a first bit-line control circuit 410 configured to control the bit lines 406 and sense the memory cells 402 in a digital mode, and a second bit-line control circuit 412 configured to bias the bit lines 406 and sense the memory cells 402 in an analog mode. Each of the memory cells 402 is coupled to one of the word lines 404 and one of the bit lines 406. The first bit-line control circuit 410 is coupled to a first end 406a of each of the bit lines 406. The second bit-line control circuit 412 is coupled to a second end 406b of each of the bit lines 406. The second end 406b of the bit lines 406 is opposite to the first end 406a of the bit lines 406.

The non-volatile memory device 400 further includes a plurality of source lines 420 extended in the column direction. Each of the source lines 420 is coupled to a column of the memory cells 402. The non-volatile memory device 400 further includes a memory device control circuit 430 coupled to and configured to control the word-line control circuit 408, the first bit-line control circuit 410, and the second bit-line control circuit 412. The structures and functions of the non-volatile memory device 400 are similar to those of the non-volatile memory device 300 in FIG. 3, except that the source line 420 are arranged to extend in the column direction.

Figure 5:
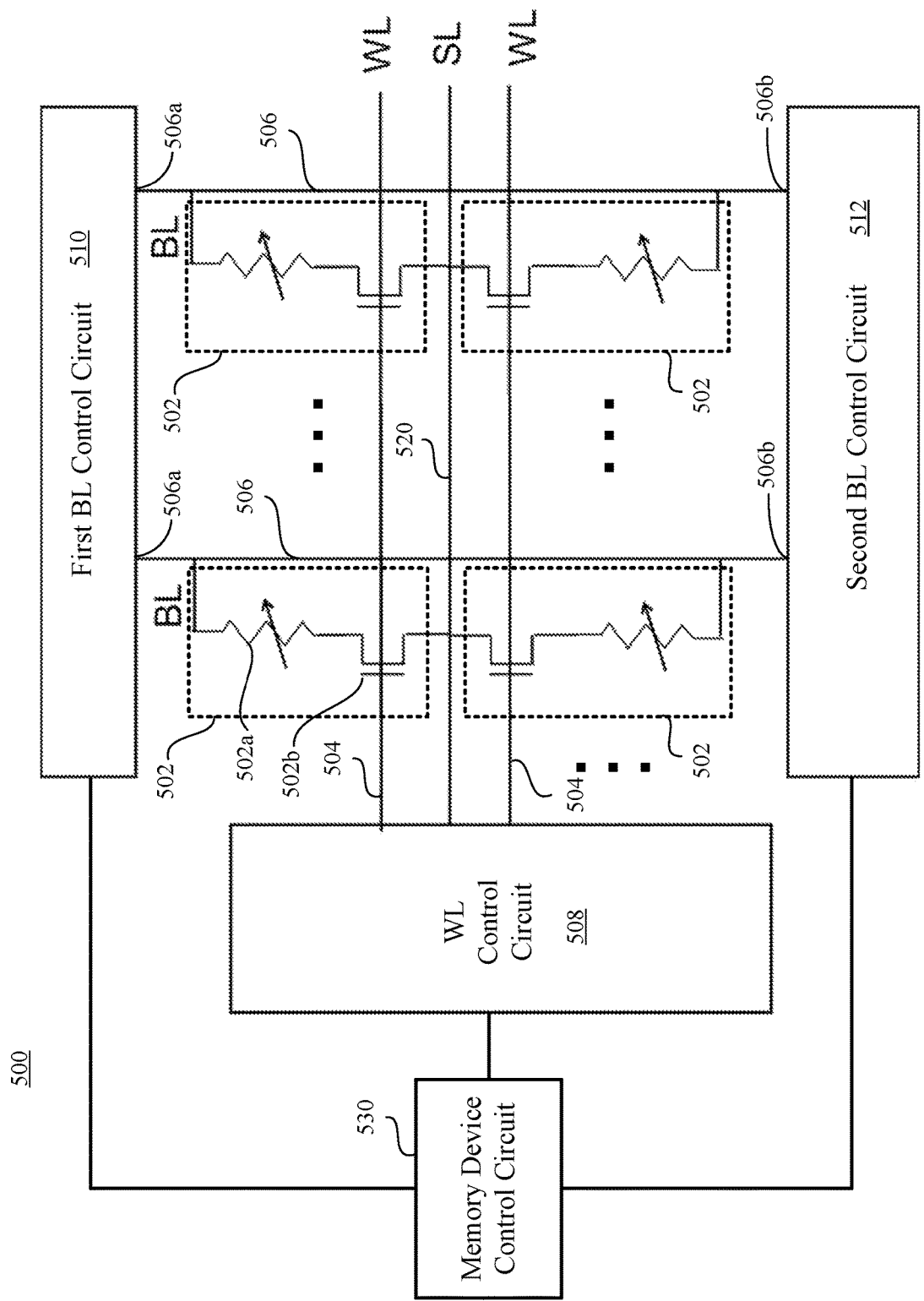
FIG. 5 is a schematic diagram illustrating yet another non-volatile memory device, according to one example embodiment.

FIG. 5 is a schematic diagram illustrating a non-volatile memory device 500, according to one example embodiment. The non-volatile memory device 500 may be an RRAM. The non-volatile memory device 500 includes a plurality of memory cells 502 arranged in a matrix, a plurality of word lines 504 extended in a row direction, and a plurality of bit lines 506 extended in a column direction. The non-volatile memory device 500 further includes a word-line control circuit 508 coupled to and configured to control the word lines 504, a first bit-line control circuit 510 configured to control the bit lines 506 and sense the memory cells 502 in a digital mode, and a second bit-line control circuit 512 configured to bias the bit lines 506 and sense the memory cells 502 in an analog mode. Each of the memory cells 502 is coupled to one of the word lines 504 and one of the bit lines 506. The first bit-line control circuit 510 is coupled to a first end 506a of each of the bit lines 506. The second bit-line control circuit 512 is coupled to a second end 506b of each of the bit lines 506. The second end 506b of the bit lines 506 is opposite to the first end 506a of the bit lines 506. The non-volatile memory device 500 further includes a plurality of source lines 520 extended in the row direction. Each of the source lines 520 is coupled to two rows of the memory cells 502. The non-volatile memory device 500 further includes a memory device control circuit 530 coupled to and configured to control the word-line control circuit 508, the first bit-line control circuit 510, and the second bit-line control circuit 512. The structures and functions of the non-volatile memory device 500 are similar to those of the non-volatile memory device 100 in FIG. 1, except that each of the source line 520 are coupled to two rows of memory cells 502.

Figure 6:
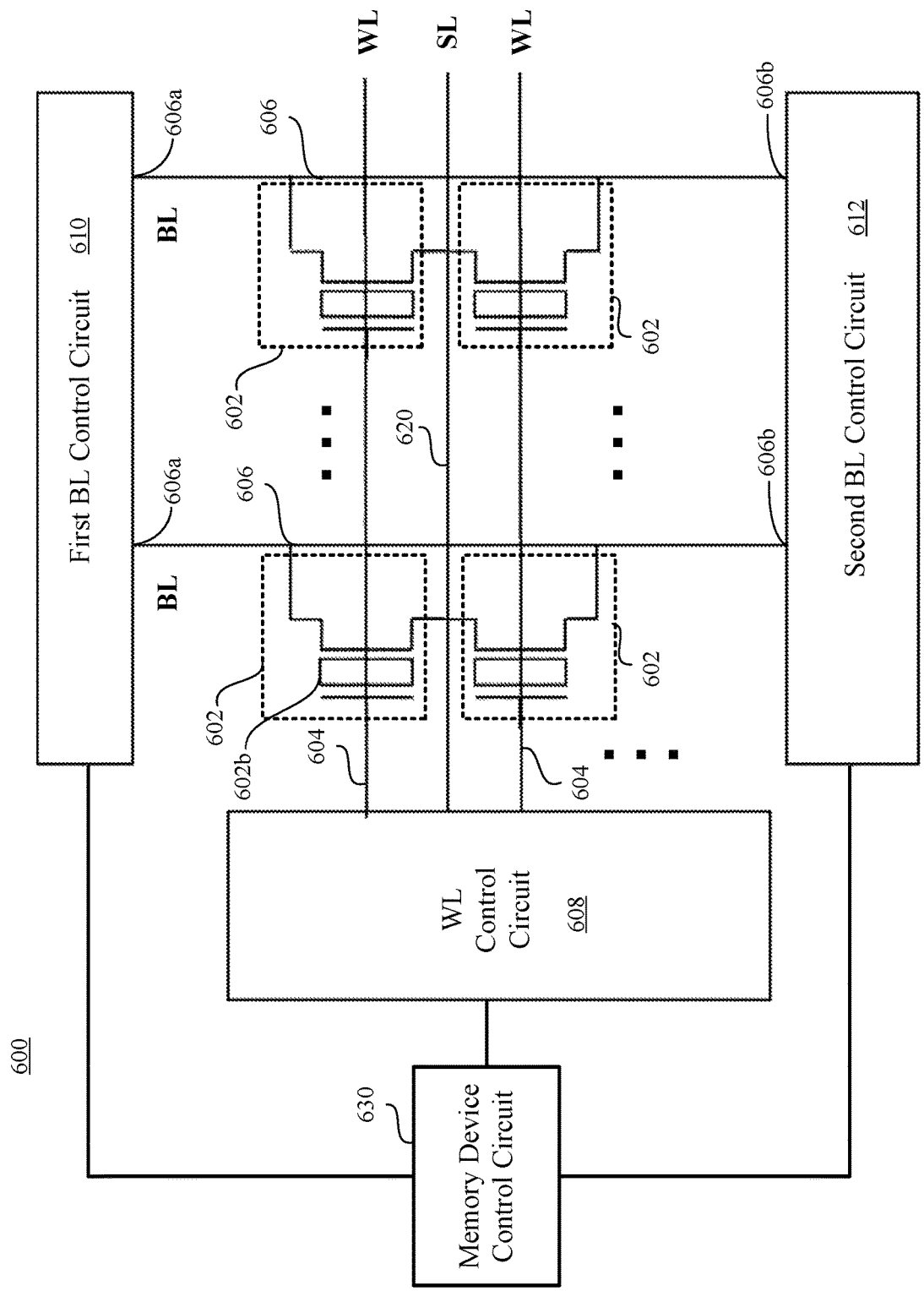
FIG. 6 is a schematic diagram illustrating yet another non-volatile memory device, according to one example embodiment.

FIG. 6 is a schematic diagram illustrating a non-volatile memory device 600, according to one example embodiment. The non-volatile memory device 600 includes a plurality of memory cells 602 arranged in a matrix, a plurality of word lines 604 extended in a row direction, and a plurality of bit lines 606 extended in a column direction. The non-volatile memory device 600 further includes a word-line control circuit 608 coupled to and configured to control the word lines 604, a first bit-line control circuit 610 configured to control the bit lines 606 and sense the memory cells 602 in a digital mode, and a second bit-line control circuit 612 configured to bias the bit lines 606 and sense the memory cells 602 in an analog mode. Each of the memory cells 602 is coupled to one of the word lines 604 and one of the bit lines 606. The first bit-line control circuit 610 is coupled to a first end 606a of each of the bit lines 606. The second bit-line control circuit 612 is coupled to a second end 606b of each of the bit lines 606. The second end 606b of the bit lines 606 is opposite to the first end 606a of the bit lines 606. The non-volatile memory device 600 further includes a plurality of source lines 620 extended in the row direction. Each of the source lines 620 is coupled to two rows of the memory cells 602. The non-volatile memory device 600 further includes a memory device control circuit 630 coupled to and configured to control the word-line control circuit 608, the first bit-line control circuit 610, and the second bit-line control circuit 612. The structures and functions of the non-volatile memory device 600 are similar to those of the non-volatile memory device 300 in FIG. 1, except that each of the source line 620 are coupled to two rows of memory cells 602.

Figure 7:
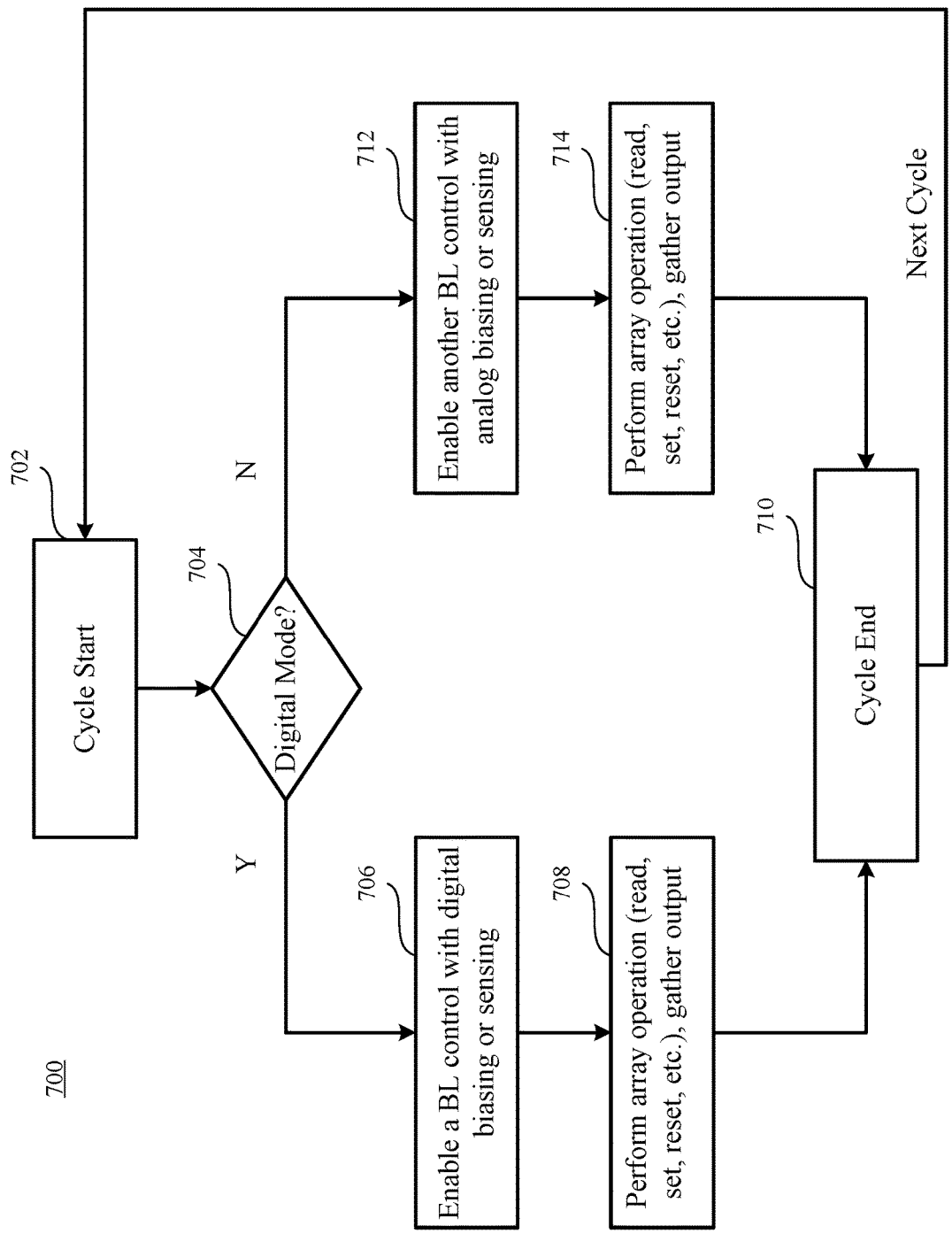
FIG. 7 is a flow chart illustrating an operation method of a non-volatile memory device, according to one example embodiment.

The operations and applications of the non-volatile memory devices are further explained hereinafter. Reference is made to FIG. 7. FIG. 7 is a flow chart illustrating an operation method 700 of a non-volatile memory device, according to one example embodiment. The method 700 may be performed by a memory device control circuit, such as any one of the memory device control circuits 130 (FIG. 1), 230 (FIG. 2), 330 (FIG. 3), 430 (FIG. 4), 530 (FIG. 5), and 630 (FIG. 6). The non-volatile memory device may be a mixed digital-analog memory device. At 702, the memory device control circuit starts a cycle to operate the non-volatile memory device. For example, the memory device control circuit may be instructed to start a read, set, or write operation on the non-volatile memory device. Because the memory cells of the non-volatile memory device may be operated in a digital mode (two switching states) or in an analog mode (more than two switching states), at 704 the memory device control circuit determines whether the operation is to be performed in the digital mode (or in the analog mode). If the operation is to be performed in the digital mode (Y at 704), at 706 the memory device control circuit enables a bit line control circuit with digital biasing and sensing functions. At 708, the memory device control circuit performs a memory array operation (read, set, reset, etc.) in the digital mode on a first portion of memory cells. For example, the memory device control circuit controls a word line control circuit and the digital-mode bit line control circuit to apply signals to the first portion of memory cells. In some embodiments, the memory device control circuit may also gather an output from the operation. The operation cycle ends at 710. In this cycle, no memory cell is operated in the analog mode.

In a next operation cycle, the method 700 returns to 702. If the operation is to be performed in the analog mode (N at 704), at 712 the memory device control circuit enables another bit line control circuit with analog biasing and sensing functions. At 714, the memory device control circuit performs a memory array operation (read, set, reset, etc.) in the analog mode on a second portion of the memory cells. For example, the memory device control circuit controls a word line control circuit and the analog-mode bit line control circuit to apply signals to the second portion of the memory cells. In some embodiments, the memory device control circuit may also gather an output from the operation. The operation cycle then ends at 710. In this cycle, no memory cell is operated in the digital mode. In this operation scheme, the memory device control circuit is configured to read or write the first portion of the memory cells in digital mode and the second portion of the memory cells in analog mode in different operation cycles.

Figure 8:
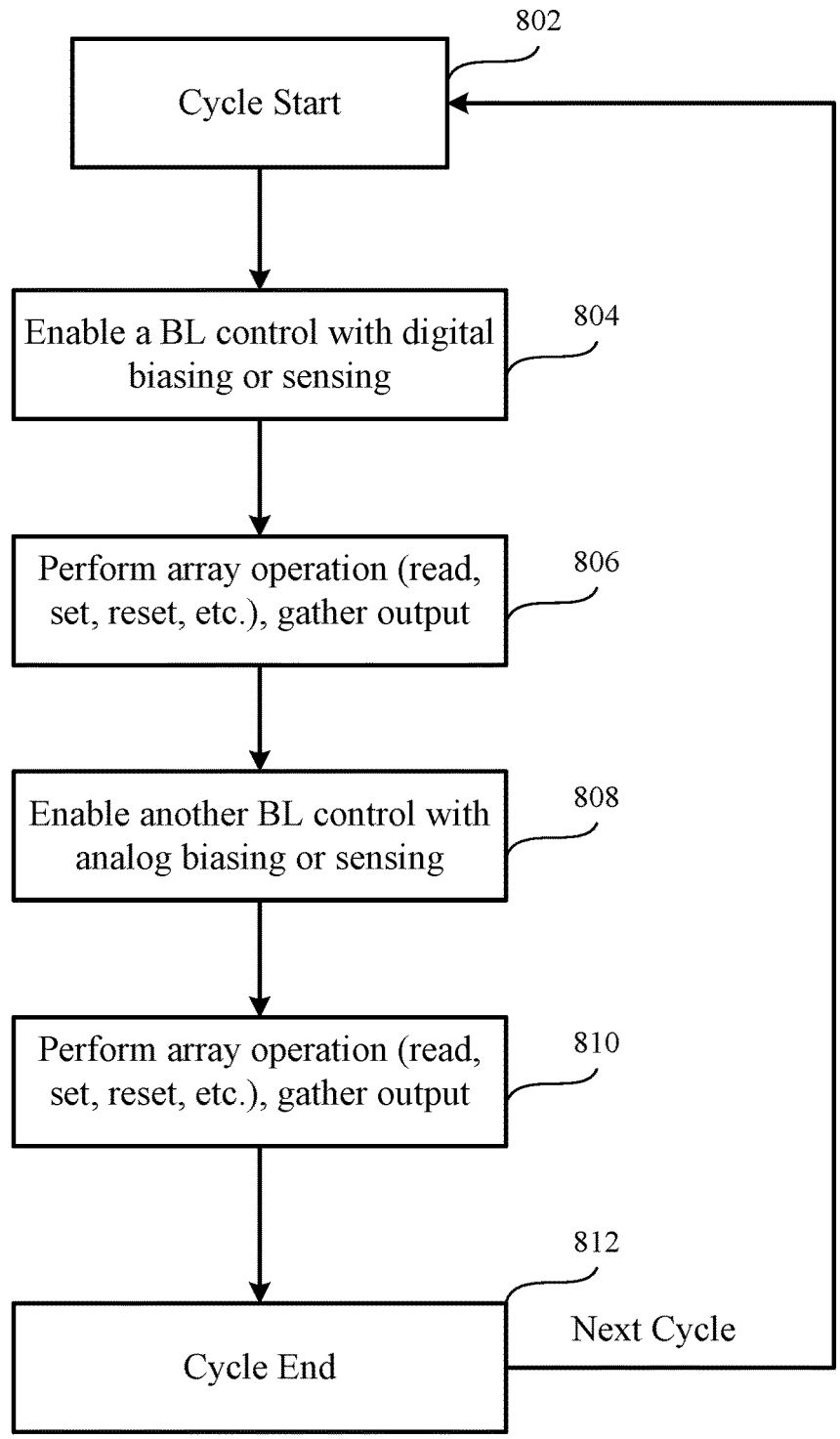
FIG. 8 is a flow chart illustrating another operation method of a non-volatile memory device, according to one example embodiment.

FIG. 8 is a flow chart illustrating an operation method 800 of a non-volatile memory device, according to one example embodiment. For example, the method 800 may be performed by a memory device control circuit, such as any one of the memory device control circuits 130 (FIG. 1), 230 (FIG. 2), 330 (FIG. 3), 430 (FIG. 4), 530 (FIG. 5), and 630 (FIG. 6). The non-volatile memory device may be a mixed digital-analog memory device. At 802, the memory device control circuit starts a cycle to operate the non-volatile memory device. For example, the memory device control circuit may be instructed to start a read, set, or write operation on the non-volatile memory device. At 804, the memory device control circuit enables a bit line control circuit with digital biasing and sensing functions. At 806, the memory device control circuit performs a memory array operation (read, set, reset, etc.) in the digital mode on a first portion of memory cells. For example, the memory device control circuit controls a word line control circuit and the digital-mode bit line control circuit to apply signals to the first portion of memory cells in the memory array operation. In some embodiments, the memory device control circuit may also gather an output from the operation at 806.

At 808, the memory device control circuit enables another bit line control circuit with analog biasing and sensing functions. At 810, the memory device control circuit performs a memory array operation (read, set, reset, etc.) in the analog mode on a second portion of the memory cells. For example, the memory device control circuit controls a word line control circuit and the analog-mode bit line control circuit to apply signals to the second portion of the memory cells. In some embodiments, the memory device control circuit may also gather an output from the operation at 810. The operation cycle then ends at 812. In this operation scheme, the memory device control circuit is configured to read or write the first portion of the memory cells in the digital mode and the second portion of the memory cells in the analog mode in one operation cycle. It is to be understood that although the digital mode operation starts before the analog mode operation as shown in FIG. 8, in some embodiments, the analog mode operation may start before the digital mode operation.

Figure 9:
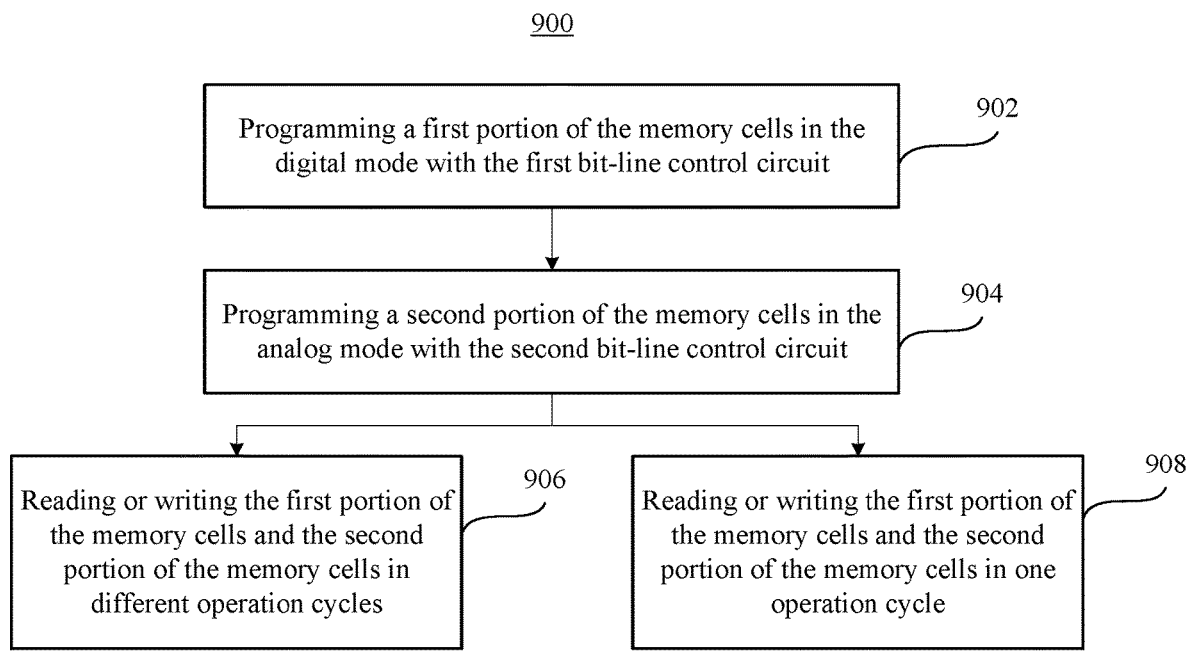
FIG. 9 is a flow chart illustrating an operation method of a non-volatile memory device, according to one example embodiment.

FIG. 9 is a flow chart illustrating an operation method 900 of a non-volatile memory device, according to one example embodiment. For example, the method 900 may be performed by a memory device control circuit, such as any one of the memory device control circuits 130 (FIG. 1), 230 (FIG. 2), 330 (FIG. 3), 430 (FIG. 4), 530 (FIG. 5), and 630 (FIG. 6). The non-volatile memory device is a mixed digital-analog memory device. At 902, a first portion of the memory cells of the memory device is programmed in the digital mode with a first bit-line control circuit (e.g., the first bit-line control circuit 110 in FIG. 1). At 904, a second portion of the memory cells of the memory device is programmed in the analog mode with a second bit-line control circuit (e.g., the second bit-line control circuit 112 in FIG. 1). At 906, the first portion of the memory cells and the second portion of the memory cells are subject to an array operation (e.g., reading or writing) in different operation cycles. Additionally or alternatively, at 908, the first portion of the memory cells and the second portion of the memory cells are subject to an array operation (e.g., reading or writing) in one operation cycle.

Figure 10:
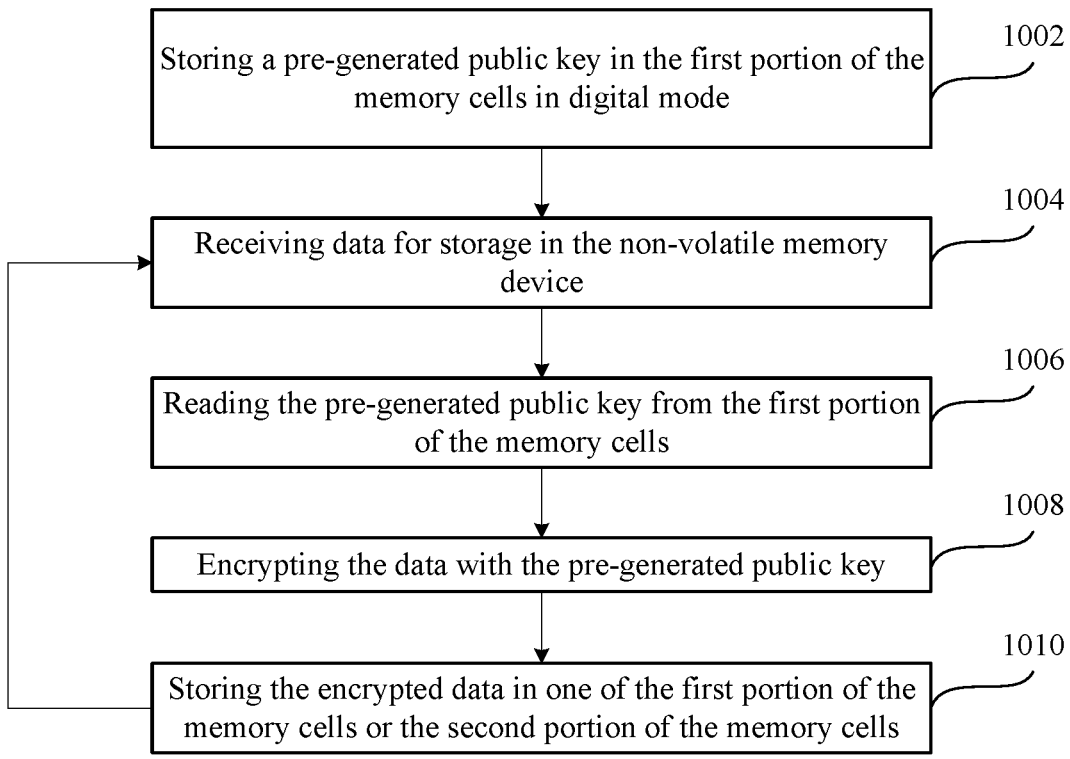
FIG. 10 is a flow chart illustrating a method for employing a mixed digital-analog non-volatile memory device to improve data storage security, according to one example embodiment.

FIG. 10 is a flow chart illustrating a method 1000 for employing a mixed digital-analog non-volatile memory device to improve data storage security, according to one example embodiment. For example, the method 1000 may be performed by a memory device control circuit, such as any one of the memory device control circuits 130 (FIG. 1), 230 (FIG. 2), 330 (FIG. 3), 430 (FIG. 4), 530 (FIG. 5), and 630 (FIG. 6). At 1002, a pre-generated public key is stored in the first portion of the memory cells in digital mode. For example, a pair of a public key and a private key is generated for a user for data security. A server or a user device associated with the user may generate the public key and the private key. The pre-generated public key may be stored in any of the non-volatile memory devices disclosed herein. Particularly, pre-generated public key may be stored in memory cells programmed in a digital mode. The user may keep the private key at a different, safe location.

At 1004, data is received for storage in the non-volatile memory device. At 1006, in response to the instruction to store the received data, the memory device control circuit reads/obtains the pre-generated public key from the first portion of the memory cells. At 1008, the memory device control circuit encrypts the data with the pre-generated public key. At 1010, the encrypted data is stored in the non-volatile memory device. In some embodiments, the encrypted data may be stored in the digital mode in the first portion of the memory cells. In some embodiments, the encrypted data may be stored in the analog mode in a second portion of the memory cells. These techniques allow user data to be securely stored, e.g., encrypted with a pre-generated key. As a result, even when the stored data is stolen, the data can be safe guarded because only the owner/user has the private key that can decrypt the encrypted data. The techniques also provide a solution to automatically encrypt data whenever the data is stored in the non-volatile memory device that stores a pre-generated key.

Figure 11:
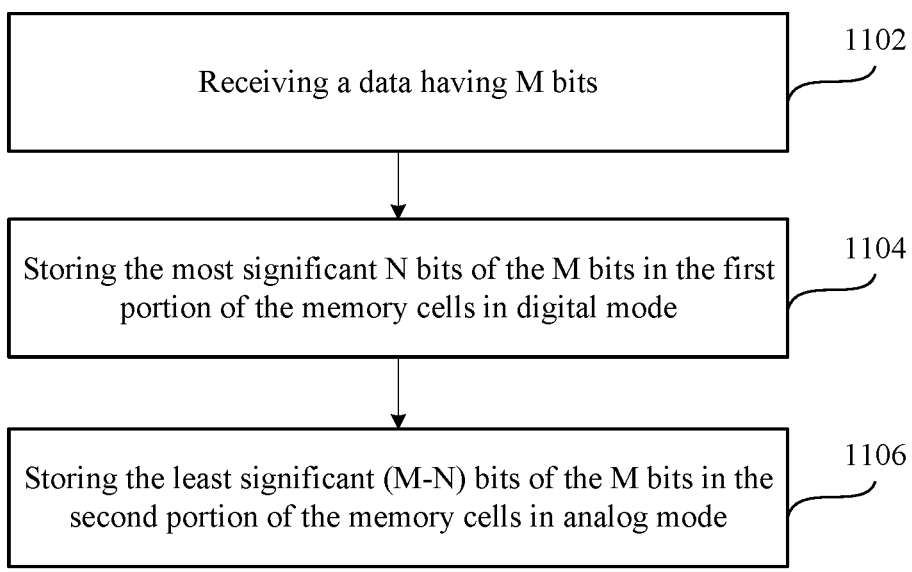
FIG. 11 is a flow chart illustrating a method for employing a mixed digital-analog non-volatile memory device for data storage, according to one example embodiment.

FIG. 11 is a flow chart illustrating a method 1100 for employing a mixed digital-analog non-volatile memory device for data storage, according to one example embodiment. For example, the method 1100 may be performed by a memory device control circuit, such as any one of the memory device control circuits 130 (FIG. 1), 230 (FIG. 2), 330 (FIG. 3), 430 (FIG. 4), 530 (FIG. 5), and 630 (FIG. 6). At 1102, the memory device control circuit receives a data having M bits, where M≥2. At 1104, the most significant N bits of the M bits is stored in a digital mode in a first portion of the memory cells of the non-volatile memory device. At 1106, the least significant (M−N) bits of the M bits are stored in an analog mode in a second portion of the memory cells of the non-volatile memory device. In the illustrated embodiment, digital storage has better accuracy/reliability but requires larger a chip area compared to analog storage. Thus, a mixed digital-analog non-volatile memory device may be employed to enable both digital storage and analog storage to obtain high accuracy/reliability and to conserve chip area, thus reducing cost for storage.

For example, data that needs to have high accuracy/reliability may be stored in the digital mode while data that requires less accuracy may be stored in the analog mode. In some embodiments, weight values for a neural network can be stored with digital storage and/or analog storage. The neural network itself is inherently error-tolerant especially regarding the least significant bits (LSB). To take this advantage, in one embodiment, a non-volatile memory device may be provided with a memory device control circuit that stores the most significant bits of a weight data in the digital mode and stores the LSB of the weight data in the analog mode. Because the LSB of the weight data is stored in the analog mode, a chip size for an integrated circuit chip for the neural network may be reduced to save cost. Although the LSB of the weight data may be stored with minor errors, the neural network may still function.

To obtain an inference from an existing model with a neural network, the following computation may be used:

$Y = WX,$ $X = [x1, x2, \ldots, xn]^T,$ $Y = [y1, y2, \ldots, ym]^T,$ $W = [w11, w12, \ldots, w1n; \ldots; wm1, \ldots, wmn],$ where Y is an inference matrix, X is input values, and W is weights values for the model of the neural network. A mixed digital-analog non-volatile memory device disclosed herein may be employed to perform the inference computation.

Figure 12:
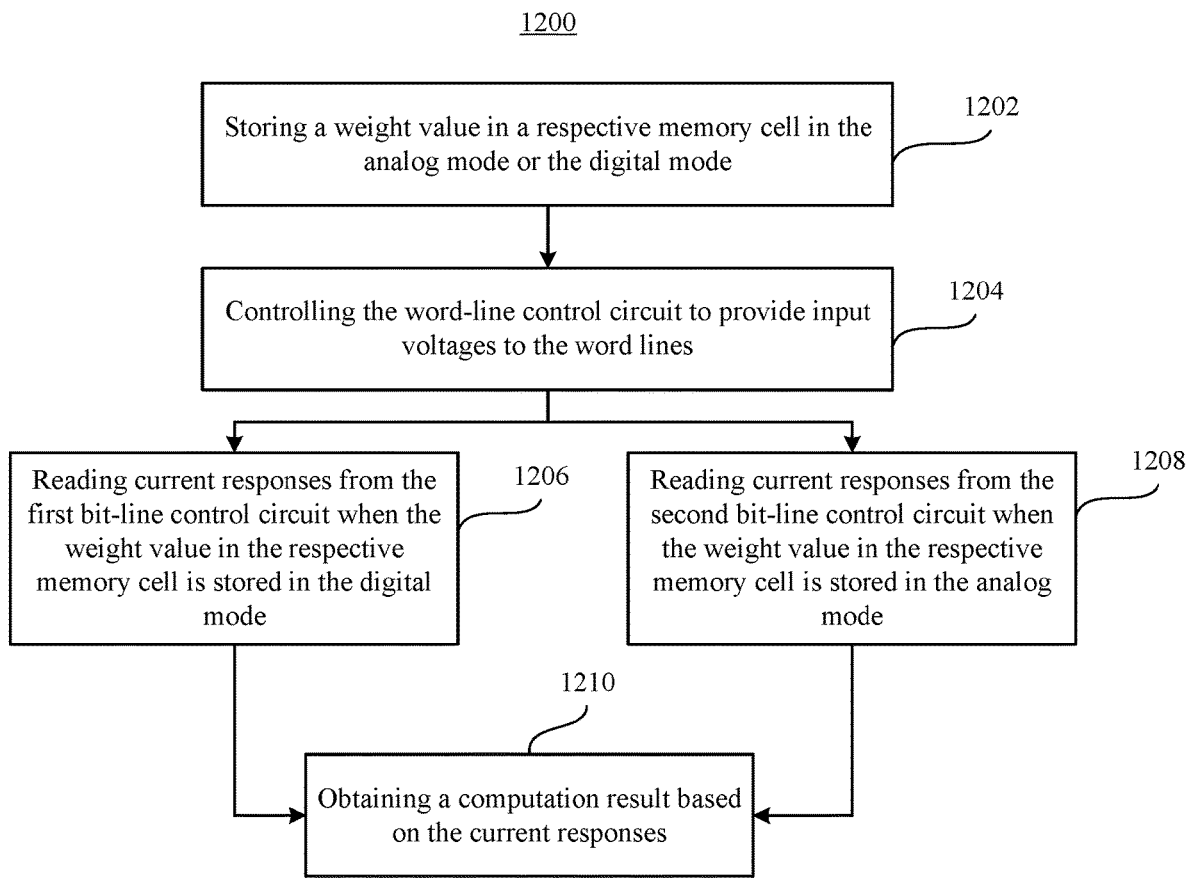
FIG. 12 is a flow chart illustrating a method for employing a mixed digital-analog non-volatile memory device for computation applications, according to one example embodiment.

FIG. 12 is a flow chart illustrating a method 1200 for employing a mixed digital-analog non-volatile memory device for computation applications, according to one example embodiment. For example, the method 1200 may be performed by a memory device control circuit, such as any one of the memory device control circuits 130 (FIG. 1), 230 (FIG. 2), 330 (FIG. 3), 430 (FIG. 4), 530 (FIG. 5), and 630 (FIG. 6). At 1202, the memory device control circuit stores a weight value in a respective memory cell of the non-volatile memory device in the analog mode or the digital mode. The weight values for a neural network are first stored in memory cells in the digital mode and/or analog mode. Because the mixed digital-analog non-volatile memory device consistent with the embodiments of this disclosure can be operated in the digital mode and/or the analog mode, the weight values may be stored in one or both modes. In some embodiments, the weight values for the neural network can be securely stored in the memory cells using the encryption method explained in connection with FIG. 10. In some embodiments, the weight values may be stored with mixed digital-analog modes as explained in connection with FIG. 11.

At 1204, the memory device control circuit controls the word-line control circuit to provide input voltages to the word lines. In the illustrated embodiment, the input values for the neural network computation may be provided in the form of voltage inputs applied to the word lines of the non-volatile memory device. The input voltages can be presented in the digital mode or the analog mode. For example, to simulate the digital mode, the input voltages include two values that correspond to 0 and 1. To simulate the analog mode, the input voltages may include more than two different values that correspond to multiple input values for the neural network.

At 1206, the memory device control circuit obtains current responses from a first bit-line control circuit when the weight value in the respective memory cell is stored in the digital mode. Additionally or alternatively, at 1208 the memory device control circuit obtains current responses from a second bit-line control circuit when the weight value in the respective memory cell is stored in the analog mode. In the illustrated embodiment, an output of the neural network may be obtained by reading the outputs from the bit lines. In some embodiments, at 1210 a computation result is obtained based on the current responses. For example, when the computation is performed on health data of a patient, whether a patient has a particular illness can be determined based on the current responses. The techniques may be used to solve questions based on a neural network or machine learning solution.

Figure 13:
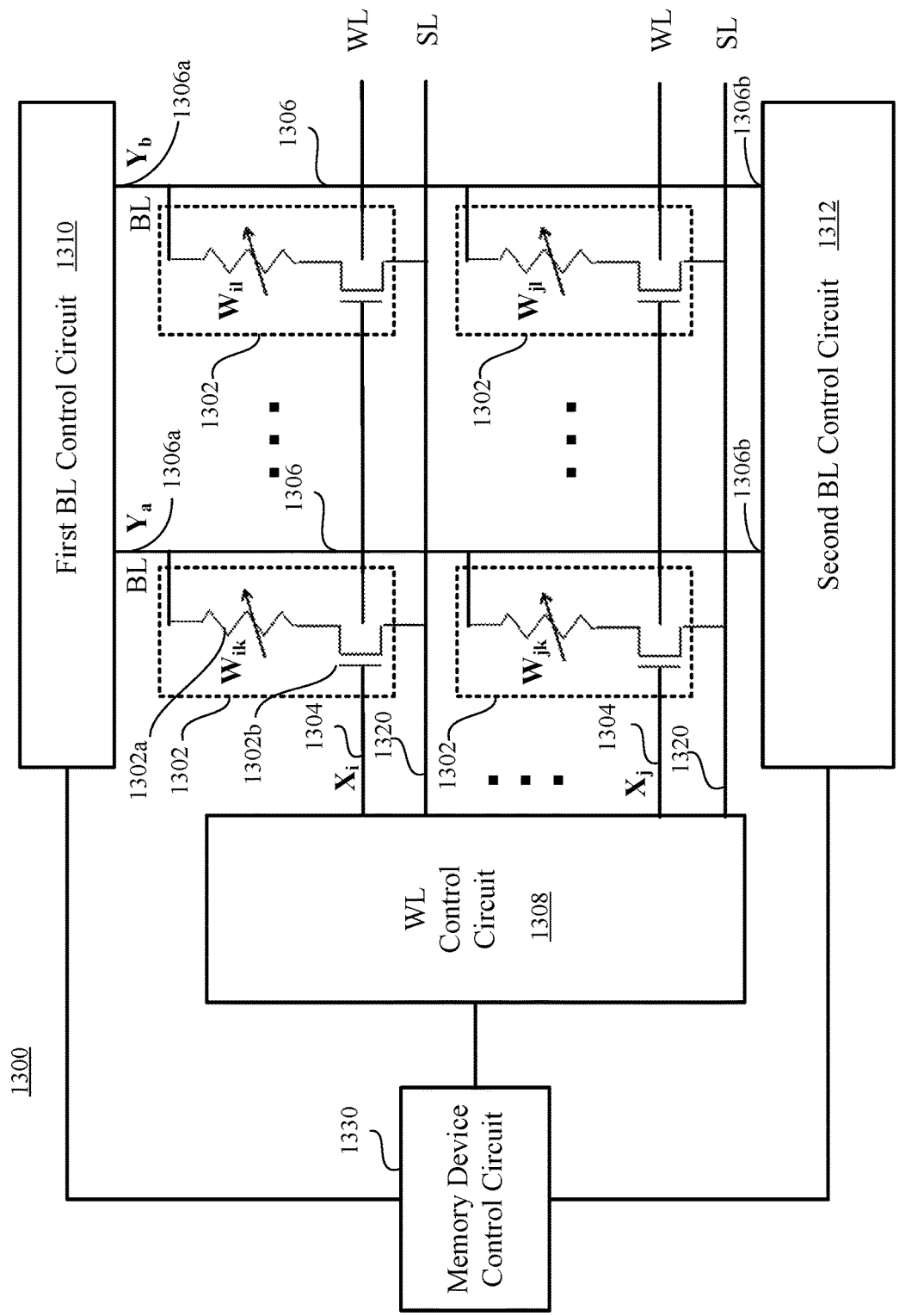
FIG. 13 is a schematic diagram illustrating a non-volatile memory device for neural network computation, according to one example embodiment.

FIG. 13 is a schematic diagram illustrating a non-volatile memory device 1300 for neural network computation, according to one example embodiment. The non-volatile memory device 1300 includes a plurality of memory cells 1302 arranged in a matrix, a plurality of word lines 1304 extended in a row direction, and a plurality of bit lines 1306 extended in a column direction. The non-volatile memory device 1300 further includes a word-line control circuit 1308 coupled to and configured to control the word lines 1304, a first bit-line control circuit 1310 configured to control the bit lines 1306 and sense the memory cells 1302 in a digital mode, and a second bit-line control circuit 1312 configured to bias the bit lines 1306 and sense the memory cells 1302 in an analog mode. Each of the memory cells 1302 is coupled to one of the word lines 1304 and one of the bit lines 1306. The first bit-line control circuit 1310 is coupled to a first end 1306a of each of the bit lines 1306. The second bit-line control circuit 1312 is coupled to a second end 1306b of each of the bit lines 1306. The second end 1306b of the bit lines 1306 is opposite to the first end 1306a of the bit lines 1306.

The non-volatile memory device 1300 further includes a plurality of source lines 1320 extended in the row direction. Each of the source lines 1320 is coupled to a row of the memory cells 1302. In some embodiments, each of the memory cells 1302 may include a resistive element 1302a and a transistor 1302b. Each of the memory cells 1302 is configured to store a weight value W ($W_{ik}$, $W_{il}$, $W_{jk}$, $W_{jl}$, etc.) for a neural network in a form of resistance. In some embodiments, the weight values may be stored in the form of charges. The weight values W may be stored in the memory cells 1302 in the digital or analog mode. Input values are provided to the memory cells 1302 in the form of input voltages $X_i$, . . . , $X_j$ from the word lines 1304. The input values may also be provided to the memory cells 1302 in the digital or analog mode. The output Y including $Y_a$ and $Y_b$ in the form of current responses may be read from the bit lines 1306. The output Y may be used to determine a result for a neural network.

Figure 14:
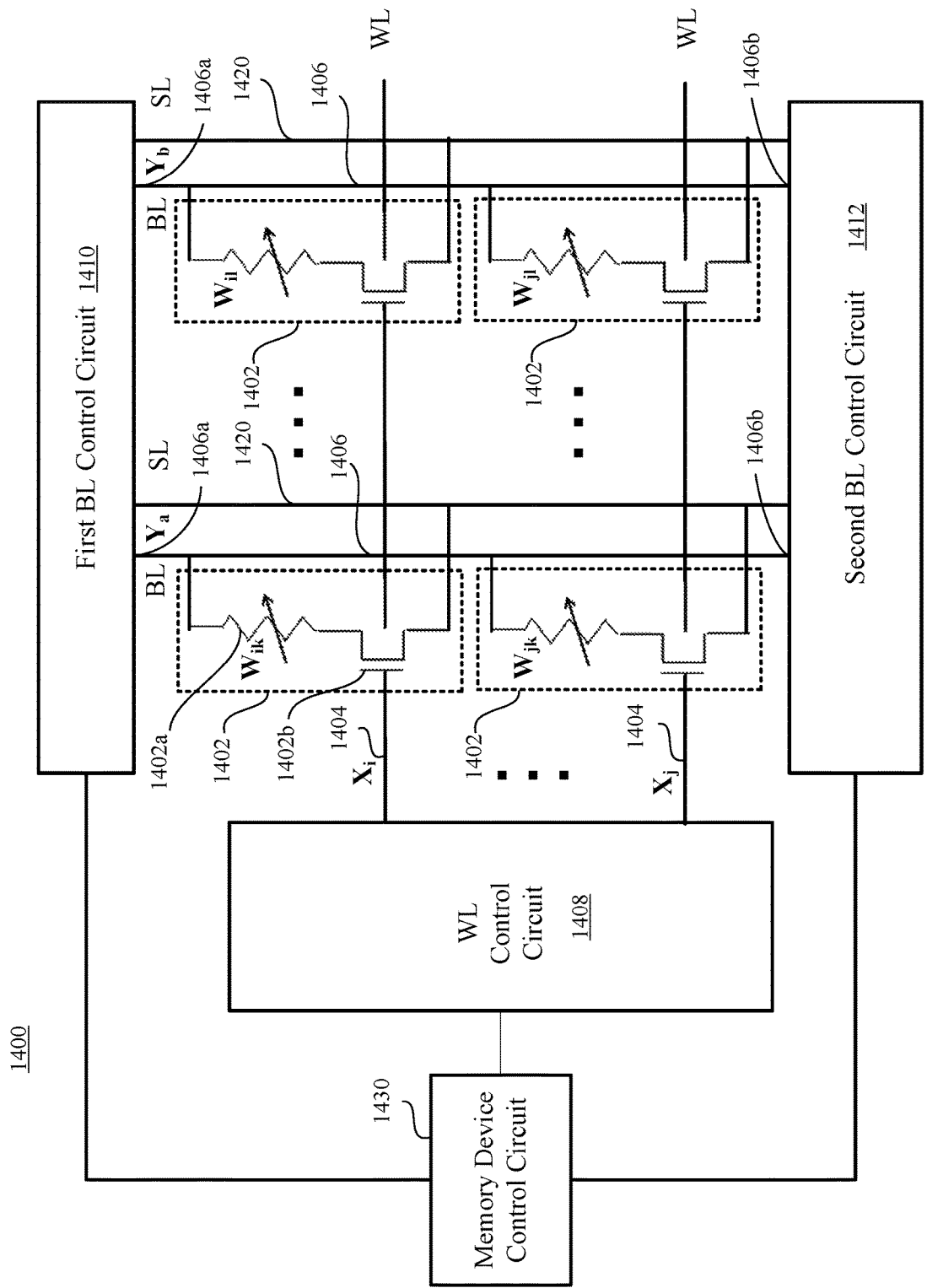
FIG. 14 is a schematic diagram illustrating another non-volatile memory device for neural network computation, according to one example embodiment.

FIG. 14 is a schematic diagram illustrating another non-volatile memory device 1400 for neural network computation, according to one example embodiment. The non-volatile memory device 1400 includes a plurality of memory cells 1402 arranged in a matrix, a plurality of word lines 1404 extended in a row direction, and a plurality of bit lines 1406 extended in a column direction. The non-volatile memory device 1400 further includes a word-line control circuit 1408 coupled to and configured to control the word lines 1404, a first bit-line control circuit 1410 configured to control the bit lines 1406 and sense the memory cells 1402 in a digital mode, and a second bit-line control circuit 1412 configured to bias the bit lines 1406 and sense the memory cells 1402 in an analog mode. Each of the memory cells 1402 is coupled to one of the word lines 1404 and one of the bit lines 1406. The first bit-line control circuit 1410 is coupled to a first end 1406a of each of the bit lines 1406. The second bit-line control circuit 1412 is coupled to a second end 1406b of each of the bit lines 1406. The second end 1406b of the bit lines 1406 is opposite to the first end 1406a of the bit lines 1406.

The non-volatile memory device 1400 further includes a plurality of source lines 1420 extended in the column direction. Each of the source lines 1420 is coupled to a column of the memory cells 1402. In some embodiments, each of the memory cells 1402 may include a resistive element 1402a and a transistor 1402b. Each of the memory cells 1402 is configured to store a weight value W ($W_{ik}$, $W_{il}$, $W_{jk}$, $W_{jl}$, etc.) for a neural network in the form of resistance. In some embodiments, the weight values may be stored in the form of charges. The weight values W may be stored in the memory cells 1402 in the digital or analog mode. Input values are provided to the memory cells 1402 in the form of input voltages $X_i$, . . . , $X_j$ from the word lines 1404. The input values may also be provided to the memory cells 1402 in the digital or analog mode. The output Y including $Y_a$ and $Y_b$ in the form of current responses may be read from either the bit lines 1406 or the source lines 1420.

Figure 15:
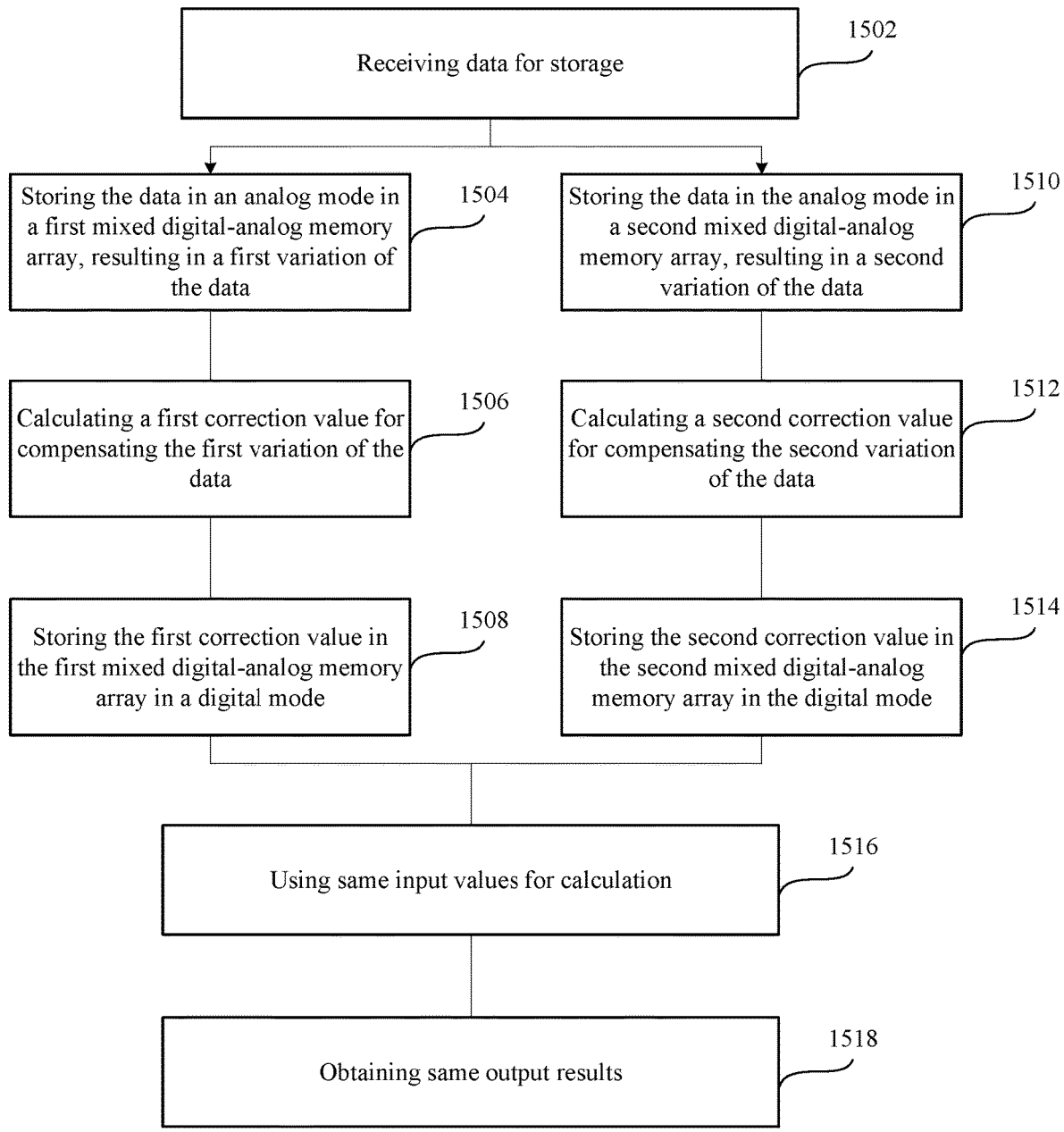
FIG. 15 is a flow chart illustrating a method for employing mixed digital-analog non-volatile memory devices for secure storage, according to one example embodiment.

FIG. 15 is a flow chart illustrating a method 1500 for employing mixed digital-analog non-volatile memory devices for secure storage, according to one example embodiment. For example, the method 1500 may be performed by a processor of a computing apparatus, such as a desktop computer, a laptop computer, a server system, a mobile device, a hand-held device, etc. At 1502, the processor receives a data for storage. For example, the data may be weight values for a neural network. Other data are contemplated. At 1504, the processor stores the data in an analog mode in a first mixed digital-analog memory array, resulting in a first variation of the data. In some embodiments, the variation is created due to various performances of the memory cells in the first mixed digital-analog memory array. For example, uniformity issues in the manufacturing processes to make the first mixed digital-analog memory array may result in various performances of the memory cells. The uniformity issues not only lead to various performances in memory cells, but also to various performances in different memory arrays.

Because the data may be distorted when stored in the first mixed digital-analog memory array, at 1506 the processor calculates a first correction value for compensating the first variation of the data. In some embodiments, operation 1506 may include retraining the neural network to determine a first correction value. Other correction methods now known or later developed are contemplated. In some embodiments, the correction calculation may be provided for all digits or to selected most significant bits of the data. At 1508, the processor stores the first correction value in the first mixed digital-analog memory array in a digital mode. Although the first correction value may be used to correct a stored weight value that is distorted, a more secured method is to store the first correction value at a separate location on the first mixed digital-analog memory array. This complexity could reduce the possibility for a hacker to reverse engineer the correct weight values. The processor may create a log/map for the neural network to retrieve the first correction value from the first mixed digital-analog memory array. When performing a neural network computation, the first correction value is read and used to correct the stored weight value to obtain a correct weight value for computation. In some embodiments, the first correction value may be encrypted before it is stored in the first mixed digital-analog memory array to provide further storage security.

At 1510, the processor stores the data in the analog mode in a second mixed digital-analog memory array, resulting in a second variation of the data. As explained in 1504, the variation generally is a product of manufacturing non-uniformity. In some embodiments, the second variation of the data is different from the first variation of the data for the first mixed digital-analog memory array. At 1512, the processor calculates a second correction value for compensating the second variation of the data. The second correction value may be different from the first correction value. At 1514, the processor stores the second correction value in the second mixed digital-analog memory array in the digital mode. The processor may create a log/map for the neural network to retrieve the second correction value from the second mixed digital-analog memory array. When performing a neural network computation, the second correction value is read and employed to correct the stored weight value to obtain a correct weight value for computation. In some embodiments, the second correction value may be encrypted before it is stored in the second mixed digital-analog memory array.

These operations create two neural network memory arrays that look unlike each other. It may be difficult for a hacker to perform reverse engineering on the neural network memory arrays to obtain the correct weight values for the neural network as the weight values and the correction values stored in the memory arrays are different. Further, the correction values may be stored in different locations on the memory arrays, creating further confusion for a hacker to obtain correct weight values. Moreover, the correction values may be encrypted to add to the difficulty to know the correct weight values. Because those security measures can only be resolved by an owner and a legitimate user, the weight values for the neural network can be securely protected.

In some embodiments, at 1516 the processor with the correct knowledge of the correction values uses the same input values for a neural network calculation. At 1518, the processor obtains the same calculation results using weight values from both memory arrays.

As explained in this disclosure, a memory cell may include a resistance-change element or a charge storing element to retain data after the power to the memory cell is cut off. FIGS. 16A-16C are block diagrams illustrating memory cell structures that include resistance-change elements, according to various embodiments. Referring to FIG. 16A, a first memory cell structure 1610 includes a bottom electrode 1612, a top electrode 1614, and a resistance-change element 1616 interposed between the bottom electrode 1612 and the top electrode 1614. The resistance-change element 1616 can change the resistance measured between the top electrode 1614 and the bottom electrode 1612. The resistance change mechanism may be based on formation of an oxygen vacancy filament, a conductive bridge, a phase change, a ferroelectric switching or a spin-transfer torque (STT) switching.

FIG. 16B shows a second memory cell structure 1620 that includes a bottom electrode 1622, a resistance-change element 1624 disposed on top of the bottom electrode 1622, a top-pillar electrode 1626 disposed on the resistance-change element 1624, and a top electrode 1628 disposed on the top-pillar electrode 1626. The top-pillar electrode 1626 provides a good electrical contact between the resistance-change element 1624 and the top electrode 1628 to reduce the contact resistance.

FIG. 16C shows a third memory cell structure 1630 that includes a bottom electrode 1631, a bottom-pillar electrode 1632 disposed on the bottom electrode 1631, a resistance-change element 1633 disposed on top of the bottom-pillar electrode 1632, a top-pillar electrode 1634 disposed on the resistance-change element 1633, and a top electrode 1635 disposed on the top-pillar electrode 1634. The top-pillar electrode 1634 provides a good electrical contact between the resistance-change element 1633 and the top electrode 1635 to reduce the contact resistance. Similarly, the bottom-pillar electrode 1632 provides a good electrical contact between the resistance-change element 1633 and the bottom electrode 1631 to reduce the contact resistance.

In some embodiments, a bottom electrode may include a conductive material, such as TiN, TaN, W, or other suitable conductive materials. In some embodiments, a top electrode may include a conductive material, such as TiN, TaN, Ru, and other suitable conductive materials. A resistance-change element may be a resistive layer containing a resistive material. For example, a resistance-change element may include one or more resistive metal oxides, such as $Ta_2O_5$, $TaO_x$, etc. In some embodiments, the resistance-change element may include one or more films.

A charge-storing element can be used in a mixed digital-analog non-volatile memory device. This type of memory device is based on the changes of stored charges in the charge-storing element. A charge-storing element generally contains two or three terminals and an element that can store positive or negative charges. A charge-storing element can be switched between two charge states (digital mode) or among more than two discrete charge states (analog mode). The change of charge states can be sensed in the form of voltage or currents at certain terminals of the charge-storing element.

Figure 17B:
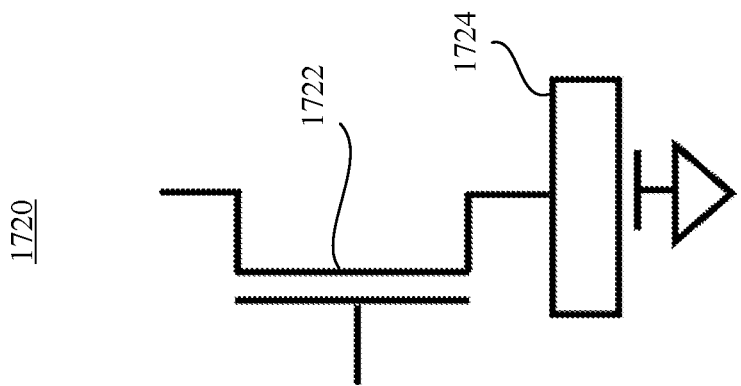
FIGS. 17A and 17B are block diagrams illustrating memory cell structures that include charge-storing elements, according to various embodiments.
Figure 17A:
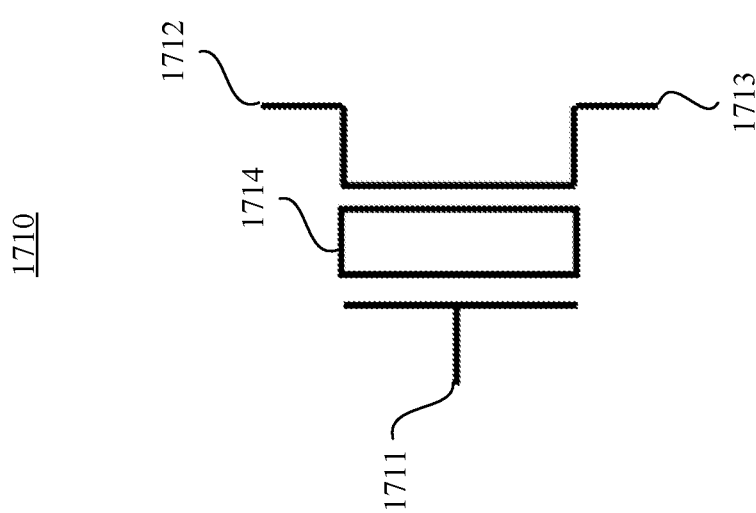

FIGS. 17A and 17B are block diagrams illustrating memory cell structures that include charge-storing elements, according to various embodiments. FIG. 17A illustrates a memory cell structure 1710 that includes a transistor having three terminals 1711, 1712, and 1713, and a floating gate 1714. The floating gate 1714 may be used to store charges. FIG. 17B illustrates another memory cell structure 1720 that includes a transistor 1722 and a capacitor 1724. The capacitor 1724 is employed to store charges for the memory cell structure 1720. In some embodiments, a digital part of a mixed digital-analog memory array can be implemented using SRAM devices.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A non-volatile memory device comprising:
  a plurality of memory cells arranged in a matrix;
  a plurality of word lines extended in a first direction, each of the memory cells coupled to one of the word lines;
  a plurality of bit lines extended in a second direction different from the first direction, each of the memory cells coupled to one of the bit lines;

a word-line control circuit coupled to and configured to control the word lines;

a first bit-line control circuit configured to control the bit lines, the first bit-line control circuit being coupled to a first end of each of the bit lines; and a second bit-line control circuit configured to control the bit lines, the second bit-line control circuit being coupled to a second end of each of the bit lines, the second end being opposite to the first end.

2. The non-volatile memory device of claim 1, wherein:
the first bit-line control circuit is configured to sense the memory cells in a digital mode; and
the second bit-line control circuit is configured to sense the memory cells in an analog mode.

3. The non-volatile memory device of claim 1, further comprising:
a plurality of source lines extended in the first direction, wherein each of the source lines is coupled to a row of the memory cells.

4. The non-volatile memory device of claim 1, further comprising:
a plurality of source lines extended in the first direction, wherein each of the source lines is coupled to two rows of the memory cells.

5. The non-volatile memory device of claim 1, further comprising:
a plurality of source lines extended in the second direction, wherein each of the source lines is coupled to a column of the memory cells.

6. The non-volatile memory device of claim 2,
wherein a first portion of the memory cells is biased and sensed in the digital mode, and a second portion of the memory cells is biased and sensed in the analog mode.

7. The non-volatile memory device of claim 6, further comprising:
a memory device control circuit coupled to the word-line control circuit, the first bit-line control circuit, and the second bit-line control circuit, wherein the memory device control circuit is configured to read or write the first portion of the memory cells and the second portion of the memory cells in different operation cycles.

8. The non-volatile memory device of claim 6, further comprising:
a memory device control circuit coupled to the word-line control circuit, the first bit-line control circuit, and the second bit-line control circuit, wherein the memory device control circuit is configured to read or write the first portion of the memory cells and the second portion of the memory cells in one operation cycle.

9. The non-volatile memory device of claim 6, wherein:
a pre-generated public key is stored in the first portion of the memory cells; and
the non-volatile memory device further includes a memory device control circuit, which upon receiving data for storage in the non-volatile memory device, is configured to:
read the pre-generated public key from the first portion of the memory cells;
encrypt the data with the pre-generated public key; and
store the encrypted data in one of the first portion of the memory cells or the second portion of the memory cells.

10. The non-volatile memory device of claim 6, further comprising:
a memory device control circuit coupled to the word-line control circuit, the first bit-line control circuit, and the second bit-line control circuit, wherein the memory device control circuit is configured to store data having M bits, wherein the most significant N bits of the M bits are stored in the first portion of the memory cells and the least significant (M−N) bits of the M bits are stored in the second portion of the memory cells.

11. The non-volatile memory device of claim 10, wherein:
the memory device control circuit is configured to enable the first bit-line control circuit to read the most significant N bits in the digital mode, and to enable the second bit-line control circuit to read the least significant (M−N) bits in the analog mode.

12. The non-volatile memory device of claim 1, wherein:
each of the memory cells includes a resistance-change element or a charge-storing element.

13. The non-volatile memory device of claim 2, further comprising:
a memory device control circuit coupled to the word-line control circuit, the first bit-line control circuit, and the second bit-line control circuit, wherein the memory device control circuit is configured to perform a neural network computation by:
storing a weight value in a respective memory cell in the analog mode or the digital mode;
controlling the word-line control circuit to provide input voltages to the word lines; and
obtaining current responses from the first bit-line control circuit when the weight value in the respective memory cell is stored in the digital mode; or
obtaining current responses from the second bit-line control circuit when the weight value in the respective memory cell is stored in the analog mode.

14. A method for operating a mixed digital-analog memory device, wherein the mixed digital-analog memory device includes:
a plurality of memory cells arranged in a matrix;
a plurality of word lines extended in a first direction, each of the memory cells coupled to one of the word lines;
a plurality of bit lines extended in a second direction different from the first direction, each of the memory cells coupled to one of the bit lines;
a word-line control circuit coupled to and configured to control the word lines;
a first bit-line control circuit configured to control the bit lines, the first bit-line control circuit being coupled to a first end of each of the bit lines; and
a second bit-line control circuit configured to control the bit lines, the second bit-line control circuit being coupled to a second end of each of the bit lines, the second end being opposite to the first end,
the method comprising:
programming a first portion of the memory cells in a digital mode with the first bit-line control circuit; and
programming a second portion of the memory cells in an analog mode with the second bit-line control circuit.

15. The method of claim 14, further comprising:
reading or writing the first portion of the memory cells and the second portion of the memory cells in different operation cycles.

16. The method of claim 14, wherein:
reading or writing the first portion of the memory cells and the second portion of the memory cells in one operation cycle.

17. The method of claim 14, further comprising:
storing a pre-generated public key in the first portion of the memory cells;
receiving data for storage in the mixed digital-analog memory device;

reading the pre-generated public key from the first portion of the memory cells;
encrypting the data with the pre-generated public key; and
storing the encrypted data in one of the first portion of the memory cells or the second portion of the memory cells.

18. The method of claim 14, further comprising:
receiving data having M bits;
storing the most significant N bits of the M bits in the first portion of the memory cells; and
storing the least significant (M–N) bits of the M bits in the second portion of the memory cells.

19. The method of claim 14, further comprising:
storing a weight value in a respective memory cell in the analog mode or the digital mode;
controlling the word-line control circuit to provide input voltages to the word lines; and
obtaining current responses from the first bit-line control circuit when the weight value in the respective memory cell is stored in the digital mode; or
obtaining current responses from the second bit-line control circuit when the weight value in the respective memory cell is stored in the analog mode.

* * * * *